US008645184B2

(12) United States Patent
Nasukawa et al.

(10) Patent No.: US 8,645,184 B2
(45) Date of Patent: Feb. 4, 2014

(54) FUTURE TECHNOLOGY PROJECTION SUPPORTING APPARATUS, METHOD, PROGRAM AND METHOD FOR PROVIDING A FUTURE TECHNOLOGY PROJECTION SUPPORTING SERVICE

(75) Inventors: Tetsuya Nasukawa, Fujisawa (JP); Risa Nishiyama, Tokyo (JP); Hironori Takeuchi, Yokohama (JP); Hideo Watanabe, Machida (JP)

(73) Assignee: International Business Machines Corporation, Armonk, NY (US)

( * ) Notice: Subject to any disclaimer, the term of this patent is extended or adjusted under 35 U.S.C. 154(b) by 1000 days.

(21) Appl. No.: 12/118,182

(22) Filed: May 9, 2008

(65) Prior Publication Data

US 2008/0288309 A1    Nov. 20, 2008

(30) Foreign Application Priority Data

May 10, 2007   (JP) .................................. 2007-126046

(51) Int. Cl.
*G06Q 30/02*    (2012.01)
(52) U.S. Cl.
CPC ..................................... *G06Q 30/02* (2013.01)
USPC .......................................................... 705/7.29
(58) Field of Classification Search
CPC ..................................................... G06Q 30/02
USPC .......................................................... 705/7.29
See application file for complete search history.

(56) References Cited

U.S. PATENT DOCUMENTS

| | | | |
|---|---|---|---|
| 7,315,861 B2 * | 1/2008 | Seibel et al. ......................... | 1/1 |
| 2003/0229470 A1 * | 12/2003 | Pejic ............................. | 702/179 |
| 2005/0197992 A1 * | 9/2005 | Kipersztok et al. ............. | 706/50 |
| 2007/0011134 A1 * | 1/2007 | Langseth et al. .................. | 707/1 |
| 2007/0016563 A1 * | 1/2007 | Omoigui ........................... | 707/3 |
| 2007/0203901 A1 * | 8/2007 | Prado et al. ...................... | 707/5 |
| 2007/0219955 A1 * | 9/2007 | Li et al. ............................. | 707/3 |
| 2008/0040324 A1 * | 2/2008 | Sadri et al. ....................... | 707/3 |

FOREIGN PATENT DOCUMENTS

| | | |
|---|---|---|
| JP | 2004-220456 | 8/2004 |
| JP | 2005-149346 | 6/2005 |

OTHER PUBLICATIONS

Khoo, C., Kornfilt, J., Oddy, R., & Myaeng, S.H. (1998). Automatic extraction of cause-effect information from newspater text without knowledge-based inferencing. Literary & Linguistic Computing, 13(4), 177-186. http://www3.ntu.edu.sg/home/assgkhoo/papers/khoo_kornfilt_oddy_myaeng.cause_effect.1998.pdf.*

(Continued)

*Primary Examiner* — Romain Jeanty
*Assistant Examiner* — Kurtis Gills
(74) *Attorney, Agent, or Firm* — William Stock; Anne Vachon Dougherty

(57) ABSTRACT

A technology projection supporting apparatus includes a describing section extracting unit and steps for extracting a problem describing section and an effect describing section from each technical document, a technical phrase extraction unit and steps to extract a technical phrase, which indicates a matter to be achieved by a technology, from each of the problem describing section and the effect describing section, an impact determination unit and steps for determining a business impact to be made by the matter indicated by the extracted technical phrase, a naming unit and steps for naming the extracted technical phrase; and a technology map generation unit for generating a technology map. The generated technology map has axes indicating time length to be required to implement technology and business impact.

6 Claims, 14 Drawing Sheets

(56) References Cited

OTHER PUBLICATIONS

Losiewicz, Paul et al., Textual Data Mining to Support Science and Technology Management, Journal of Intelligent Information Systems, 15, 19-119, 2000, http://download.springer.com/static/pdf/578/art%253A10.1023%252FA%253A1008777222412.pdf?auth66=1379872256_843eea9b5df8b62cca4ebc3720567d30&ext=.pdf.*

* cited by examiner

| PHRASE CLASSES | KEYWORDS | EXAMPLES OF EXTRACTED PHRASE |
|---|---|---|
| CHARACTERISTIC IMPROVEMENT | IMPROVE | IMPROVE USER USABILITY |
| | ENHANCE | ENHANCE EFFICIENCY FOR LIGHT UTILIZATION |
| | MITIGATE | MITIGATE INITIAL DETERIORATION |
| | BE EXCELLENT IN | BE EXCELLENT IN HEAT-COOL CYCLE |
| | INCREASE | INCREASE OF PROCESSING SPEED |
| | MAKE ... MORE | MAKE WHOLE THINNER |
| | IMPROVEMENT OF | IMPROVEMENT OF CONTRAST |
| PROBLEM ALLEVIATION | PREVENT | PREVENT IMAGE DETERIORATION |
| | SUPPRESS | SUPPRESS IMPACT OF CHANGE |
| | REDUCE | REDUCE POWER CONSUMPTION |
| | DECREASE | DECREASE CURRENT IN SEMICONDUCTOR DEVICE |
| ACHIEVEMENT OF A NEW CHALLENGE OTHER THAT THE ABOVE | ENABLE | ENABLE STRENGTH TO BE SECURED |
| | CAN DO | CAN KNOW BY COUNTING |
| | FACILITATE | FACILITATE SELECTION OF CHANNEL |
| | OBTAIN | OBTAIN FLAPPING MOTIONS |

FIG. 2

LIST OF FREQUENTLY-APPEARING WORDS IN FIELD OF ROBOT

ROBOT, DELIVERY ROBOT, ROBOT ARM, MOBILE ROBOT, ROBOT HAND,UNIAXIAL ROBOT, HAND, TRANSFER, DELIVERY AND RECEIPT, TRANSFER DEVICE, CASSETTE, OBSTACLE, REVOLUTION, LINEAR, ARM,HUMAN, MOVABLE, TRANSPORT, UP AND DOWN MOVEMENT, WAFER, PROCESSOR, MOUNTING, SEMICONDUCTOR MANUFACTURING APPARATUS, CARRYING OUT, W, COLLISION, FALL, CARRYING IN, LOADING, TRAJECTORY,CONVEYANCE DEVICE, STATION, HEAD, SPACE SAVING, ATMOSPHERE, ALIGNMENT, POSTURE, COMMUNICATION FUNCTION, LOAD, CENTER, CONVEYANCE, CHAMBER, MOVEMENT, ROTATION, LITHOGRAPHY, WORK, WAITING, AROUND, FACE, STATOR, PIN, MOTOR, ARRANGEMENT, INNER FACE, EQUIPMENT, DEVICE MANUFACTURING METHOD, OPERATION, WAFER, TOP AND BOTTOM, SHAFT, PORTION, MECHANISM, SUPPORT, FEATURE QUANTITY, STRAIGHT LINE, POSITION, ADHESION, SPACE, SUBSTRATE, TOWARD, HEIGHT,
OPERATION EFFICIENCY, DISTANCE, HOUSING, REFERENCE, ACTUATOR, SPACE, MODEL, PORT, DEVIATION, VIRTUAL, SIMULATION, WORK, TARGET, STAGE, MAIN BODY, OUTSIDE, SHAPE, STATE, TRANSMISSION, JIG, FRONT FACE, PROCESSING, THROUGHPUT, CABLE, UNIT, VACUUM, VARIOUS, MAGNETIC POLE, DAMAGE, RUN, CLAIM, OUTSIDE, STORAGE, interval, DIRECTION, SHAFT BEARING, ACCURACY, POSITIONING, GLASS SUBSTRATE, INSIDE, DESCRIPTION, SENSOR, LOCK, RING, INDOOR, SIMULTANEOUS, FORCE, ENVIRONMENT, MEMBER, SECTION, TARGET, OTHER, LENGTH, TIMES, HORIZONTAL, TIME, USE, EDGE, HUMAN, FIXATION, TIMING, STRUCTURE, RELATIVE, PERSON, DETECTOR, PART, PORTION, PENETRATION, ANGLE, DEVICE, ROOM, EFFECT, THE LIKE, RECOGNITION, VICINITY, DETECTING DEVICE

FIG. 3

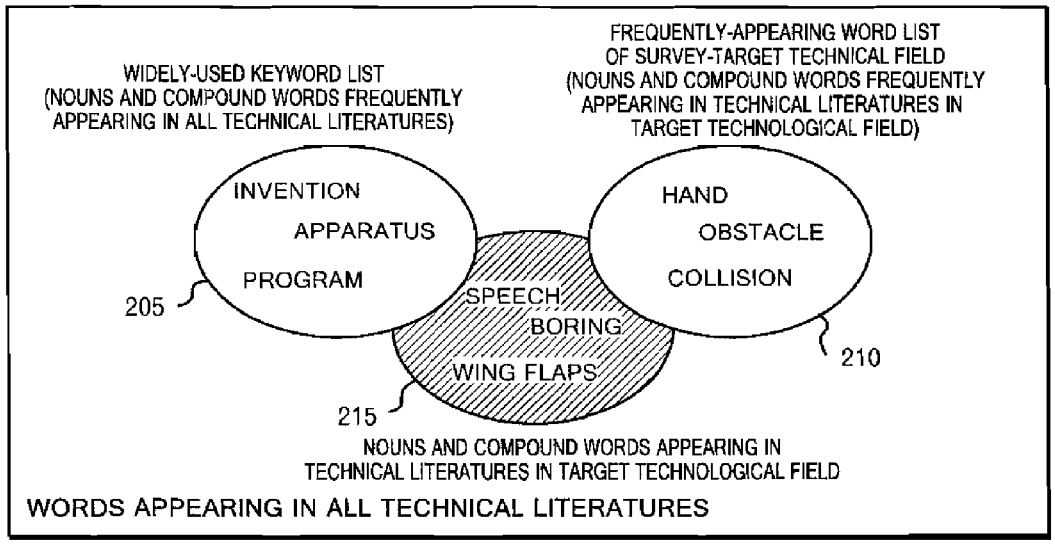

(a) DIAGRAM OF RELATIONSHIP BETWEEN NOTEWORTHY WORD LIST AND FREQUENTLY-APPEARING WORD LIST

INDIVIDUAL, ONESELF, OBJECT, LAMINATING, CONTROL, INDUSTRIAL ROBOT, DISTANT PLACE, CONTROL SYSTEM, CONSTRUCTION, SHOT, WIDE VARIETY OF PRODUCTS, OUTDOOR, VEIN, AFFECTION, CONVEYANCE, CARRIAGE, CONVEYANCE SYSTEM, TAKING-OUT AND PUTTING-IN, MEASURING MEANS, SPECIAL, SENTENCE, SPECIALIST, DIALOGUE, REAL TIME, UPDATE, FACIAL EXPRESSION, TOOL, INFORMATION COLLECTION, AUTHENTICATING MEANS, LEARNING, LOW-VOLUME PRODUCTION, END EFFECTOR, ALIGNER, ORIENTED FILM AND, RECOGNITION SYSTEM, WORK SCHEDULE, DEGREE, TIME OF BEING MOVABLE, HOME, DELIVERY, ATTENUATION PROPERTY, CONVEYANCE EFFICIENCY, BANNER, BOOST-UP, CLEANING FACTORY, D-CAD, AD-INSERTION, BORING, COMMUNICATION NETWORK, HIGH-SPEED, DIRT, CHARGE, IN, TEMPERATURE RISE, BACKGROUND, REPLENISHMENT, PROHIBITION, SPEED INCREASE, LATTICE, IN SERIES, BALL, JUDGMENT, ERROR, KNOWLEDGE, UNMANNED, DETECTOR, XY, ORIENTED FILM, PLASMA DISCHARGE, SPEECH, ADVERTISEMENT, EXTERNAL ENVIRONMENT, HIGH EFFICIENCY, CONVEYANCE WORK, STRESS, EXCLUSIVE USE, OBSERVATION, HOUSE, ENORMOUS, SITE, CONNECTOR, AIR FLOW, MOTION, SHORTENING, WITHIN A RANGE, CHEEP PRICE, DRIVING MEANS, TRAY, CAUSE, SEARCH, INNER CIRCUMFERENCE, SMALL SIZE, DECREASE, DIFFRACTION, AFTER PRINTING, CAR INTERIOR, EXCLUSIVE POSSESSION, MAINTENANCE, LEAD ACCUMULATOR, PROCESS, STROKE, DEVELOPMENT, PROCESSING SYSTEM, LIGHT PICKUP, LIGHTNING, AUTOMOBILE, SERVO MECHANISM, CONFIRMATION, ADDED, SIMPLIFY, DEGREE OF FREEDOM, PHENOMENON, IMPROVEMENT, DATA MANAGEMENT, TYPE, INSIDE PIPE, EXPERIMENT, HANDLING, CARTRIDGE, LAYOUT, CONVEYANCE TIME, SECURE, MANUFACTURING COST, HOLE, SOLDER, REMOVAL, FUEL, CRASHWORTHINESS, DETECTION, DOWN, FORCE, TRAY, ENGINE, GOODS, LABEL, STRIKE, LOW COST, INCREASE, DEAD, FOREIGN SUBSTANCE, DIVERSION, ANIMATION, DEFECTIVE, MOTION, INCH, EDDY CURRENT, DISASTER, TERM, REMOTE CONTROL, NOTCH, MOBILE DEVICE, WILL, ATTACHMENT, OBJECT, BLADE, EXPOSURE TIME, INTERNET, HIGH-SPEED OPERATION, MERCHANTABILITY, WING FLAPS, MOON SURFACE, NARROW PLACE, STOCK, ORIENTED PORTION, MANUFACTURING FACILITY, EDITING SYSTEM, CONVENIENCE, LAMINAR AIRFLOW, APRON, FIVE SENSES, SHOP VISITING CUSTOMER, AS-BUILT, WORKSHOP, NUMBER OF ITEMS, HUMAN-TYPE, AIR CONDITIONING DUCT, ENTERTAINMENT, LOADING CAPACITY, READY TO DELIVERY, SEAT - LOAD TIME, SHACKLE, MAJOR, DIVERSION, WORM, ADVERTISER, WAFER, PROCESS QUALITY, CHIP COMPONENT, RUN, STAIN, DONKEY, PARTNER, MALFUNCTION, ILLUMINATION, TACT, EXCHANGE, NEW, CALCULATION, INCREASE AND DECREASE, SOUND, APPLICATION, USER, MAINTENANCE, RESIDUAL, HIGH ORDER, PERSONAL COMPUTER, EDGE, LINK, ADJUSTMENT ACCURACY, MESSAGE, PATTERN, HARDWARE, REALITY, DELAY, SPEECH RECOGNITION, LIMITATION, VIRTUAL SPACE, PERFORMANCE, SIMILARITY, EXPENSE, INSTALLATION AREA, PLASMA, CLUSTER, OPERATION, DELIVERY, APPLICATION, SPACE EFFICIENCY, DISPLAY TUBE

(b) NOTEWORTHY WORD LIST IN FIELD OF ROBOT

FIG. 4

| ABBREVIATION RULES | KEYWORD | EXTRACTED PHRASE EXAMPLE | ABBREVIATED NAME EXAMPLE |
|---|---|---|---|
| (2 kanji characters) suru → (2 kanji characters) | o kôzyô suru (improve) | yûzâ no tukaigatte o kôzyô suru (improve user usability) | yûzâ tukaigatte kôzyô gata (user usability improving type) |
| | o kaizen suru (mitigate) | syoki no rekka o kaizen suru (mitigate initial deterioration) | syoki rekka kaizen gata (initial deterioration mitigating type) |
| | o bôsi suru (prevent) | gazô no rekka o bôsi suru (prevent image deterioration) | gazô rekka bôsi gata (image deterioration preventing type) |
| | o yokusei suru (suppress) | hendô ni yoru eikyô o yokusei suru (suppress impact of change) | hendô eikyô yokusi gata (change impact suppressing type) |
| | o teigen suru (reduce) | shôhi denryoku o teigen suru (reduce power consumption) | shôhi denryoku teigen gata (power consumption reducing type) |
| (noun) ni suru → (noun) | o yôi ni suru (facilitate) | tyanneru o sentaku suru koto o yôi ni suru (facilitate selection of channel) | tyanneru sentaku yôi gata (channel selection facilitation type) |
| | o kano ni suru (enable) | kyodô o kakuho suru koto o kanô ni suru (enable strength to be secured) | kyôdo kakuho kanô gata (strength securing enabling type) |
| (simoitidan conjugation verb indicating improvement of certain characteristic) → (verb excluding hiragana characters) | o takameru (enhance) | hikari no riyô kôritu o takameru (enhance efficiency for light utilization) | kou hikari riyô kôritu gata (high light utilization efficiency type) |
| | ni sugureru (be excellent in) | reinetu saikurusei ni sugureru (excellent in heat-cool cycle) | yu reinetu saikurusei gata (excellent heat-cool cycle type) |
| (simoitidan conjugation verb other than above and verb having only 1 kanji character) → transform each into synonym having 2 kanji characters | o osaeru (check) | riku denryu o osaeru (check leak current) | riku denryû yokusei gata (leak current check type) |
| | o ataeru (provide) | ribensei o ataeru (provide convenience) | ribensei zyûyô gata (convenience provision type) |
| | o sonaeru (include) | ôgata no hyouzi sôti o sonaeru (include large display device) | ôgata hyouzi sôti soubi gata (large display device including type) |
| | o okonau (perform) | kiroku saisei o okonau (perform recording and reproduction) | kiroku saisei zikkô gata (recording reproduction performing type) |
| | o yôsuru (have) | takai sinraisei o yôsuru (have high reliability) | kô sinraisei hoyû gata (high reliability having type) |
| | o hakaru (aim) | sôsasei no kôzyô o hakaru (aim to improve operability) | sôsasei kôzyô gata (operability improving type) |
| | o motiiru (use) | tyûkan tensyatai o motiiru (use intermediate transfer member) | tyûkan tensya siyô gata (intermediate transfer use type) |
| (noun) ka → no change | no ___ ka (make ...... more) | zentai no usugata ka (make whole thinner) | zentai usugata ka (whole tinned type) |
| (no/o)(noun) → (noun) | no kôzyô (improvement of) | syori sokudo no kôzyô (improvement of processing speed) | syori sokudo kôzyô gata (processing speed improving type) |
| | no kaizen (improvement of) | kontorasuto no kaizen (improvement of contrast) | kontorasuto kaizen gata (contrast improving type) |
| suru koto ga dekiru (capable of doing) → kano (capable) | suru koto ga dekiru (capable of doing) | caunto suru koto de hâku suru koto ga dekiru (capable of recognize by counting) | caunto kanô hâku gata (count recognition capable type) |

FIG. 5

```
<doc id=1>
<title>mobile robot control device</title>
<issue>... made by itself ... </issue>
<solution>movement of a mobile portion ... </solution>
<effect>according to the present invention, ...</effect>
</doc>
<doc id=2>
...
```

(a) ORIGINAL TECHNICAL LITERATURE

```
<doc id=1>
<future Tech time="near">capable of recognizing speech</future Tech>
<future Tech time="far"> sadô on o hâku suru koto no dekiru (capable of recognizing operating noise)</future Tech>
<title>mobile robot control device</title>
<issue>... made by itself</issue>
<solution>movement of a mobile portion ... </solution>
<effect>according to the present invention, ...</effect>
</doc>
<doc id=2>
...
```

(b) TECHNICAL LITERATURE AFTER TECHNICAL PHRASES EXTRACTION PROCESSING

```
<doc id=1>
<future Tech time="near" bi="low"> onsei ninsiki o okonau koto no dekiru (capable of recognizing speech)</future Tech>
<future Tech time="far" bi="low"> sadô on o hâku suru koto no dekiru (capable of recognizing operating noise)</future Tech>
<title>mobile robot control device</title>
<issue>... made by itself</issue>
<solution>movement of a mobile portion ... </solution>
<effect>according to the present invention, ...</effect>
</doc>
<doc id=2>
...
```

(c) TECHNICAL LITERATURE AFTER IMPACT DETERMINATION PROCESSING

```
<doc id=1>
<future Tech time="near" bi="low" name="onsei ninsiki kanô gata (speech recognition capable type)">
capable of recognizing speech</future Tech>
<future Tech time="far" bi="low" name=" sadô on hâku kanô gata (operating noise recognition capable type)">
sadô on o hâku suru koto no dekiru (capable of recognizing operating noise)</future Tech>
<title>mobile robot control device</title>
<issue>... made by itself</issue>
<solution>movement of a mobile portion ... </solution>
<effect>according to the present invention, ...</effect>
</doc>
<doc id=2>
...
```

(d) TECHNICAL LITERATURE AFTER NAMING PROCESSING

FIG. 6

FUTURE TECHNOLOGY PROJECTION SUPPORTING APPARATUS, METHOD, PROGRAM AND METHOD FOR PROVIDING A FUTURE TECHNOLOGY PROJECTION SUPPORTING SERVICE

FIELD AND BACKGROUND OF THE INVENTION

The present invention relates to a technique for providing helpful information for future technology projection by analyzing technical literatures, and particularly to a technique for estimating how long until a technology will be implemented and how large the business impact may be, by use of the contents of problem-describing sections and effect-describing sections in descriptions of technical literatures. Here, the problem-describing section is one in which problems to be solved are described, and the effect-describing section is one in which effects to be achieved by proposed solving means are described.

In recent years, social impacts of new technologies have been increasing more and more, and it has become a matter of life and death for companies to accurately understand technological trends. For this reason, heretofore, technological trends has been manually analyzed and grasped by referring to technical literatures such as patent documents and scientific literatures. However, since such manual analysis relies on intuition and experience of a person in charge of the analysis, the quality of outcome is not constant. Moreover, it is impossible to exhaustively survey a huge amount of technical literatures. Accordingly, some kind of technical support is required to carry out a highly credible technological trend survey at low personal and time costs.

A technique of automating evaluation and analysis of technical literatures through computer processing is disclosed, for example, in Japanese Patent Application Laid-open Publication Number 2005-149346. In accordance with a technique disclosed in JPA-2005-149346, keywords or keyword candidates are automatically extracted from literature information. Then, through the analysis of these keywords with a statistical technique, symbols corresponding to the respective keywords are arranged on a two-dimensional plane, and also the presence of all the literature is expressed as a distribution density on the same two-dimensional plane.

In addition, Japanese Patent Application Laid-open Publication Number 2004-220456 discloses another conventional technique. In this technique, from each sentence pattern composed of a subject (S), a predicate (V) and an object (O) described in each piece of technical literature, a combination of the predicate and the object is extracted as an item (VO=P). Then, the item (VO=P) is set on one axis while an item of the subject (S) is set on the other axis. Thereafter, the number of technical literatures including the two items is shown at an intersection of the two items on the respective axes.

A patent map or a technology map automatically generated with any of the conventional techniques including the above two patent documents indicates an overall expansion of a large amount of technical literature, and a concentration of the technical literatures in a particular area. However, the map does not provide more detailed information, such as information on what will be accomplished with the technology, and information on how long until a technology will be implemented and how large the business impact may be. For this reason, from the conventional technology map thus automatically generated, it is not possible to find a technology having a business value and to know a difficulty level for implementing the technology.

SUMMARY OF THE INVENTION

The present invention has been made in order to solve the foregoing problems. An object of the present invention is to extract technical phrases from the technical literatures through computer processing, the phrases each indicating a matter to be achieved by a technology disclosed in the technical literature, and thereby to provide each of the technical phrases together with an estimated time length to be required to implement it or together with the estimated time length to be required to implement it and its estimated business impact. In addition, another object of the present invention is to provide the thus extracted technical phrases arranged in a one-dimensional technology map having a time axis representing time length to be required to implement technology, or in a two-dimensional technology map having a time axis representing time length to be required to implement technology and an impact axis representing business impact.

The present invention for achieving these objects is implemented by a future technology projection supporting apparatus for supporting the projection of a future technological trend by analyzing a plurality of technical literatures. The future technology projection supporting apparatus includes a technical literature storage unit, a describing section extracting unit, a keyword storage unit, a technical phrase extraction unit and an analyzed data storage unit. The technical literature storage unit stores a plurality of technical literatures having a problem describing section in which a problem to be solved is described, and an effect describing section in which an effect to be achieved by proposed solving means is described. The describing section extracting unit extracts the problem describing section and the effect describing section from each of the plurality of technical documents. The keyword storage unit stores a plurality of keywords that are used as keys to extract technical phrases each indicating a matter to be achieved by a technology described in each of the plurality of technical documents. The analyzed data storage unit stores the technical phrases extracted from the problem describing section in association with a first attribute indicating that the technical phrase represents a matter to be achieved in the near future. In addition, the analyzed data storage unit stores the technical phrases extracted from the effect describing section in association with a second attribute indicating that the technical phrase represents a matter to be achieved in the far future.

Preferably, the plurality of keywords stored in the keyword storage unit are classifiable into any one of: a word indicating an improvement in the character, a word indicating problem alleviation, and a word indicating achievement of a new challenge.

Moreover, the future technology projection supporting apparatus also preferably includes an input unit, a field-by-field frequently-appearing word storage unit and a specific field selection unit. The input unit receives the designation of a technical field as a survey target. The field-by-field frequently-appearing word storage unit stores words having a high correlation value in technical literatures in each of the technical fields. With reference to frequently-appearing words in the technical field designated as the survey target through the input unit, the specific field selection unit extracts the technical phrases belonging to the survey-target technical field, from the plurality of technical phrases stored in the analyzed data storage unit.

More preferably, the future technology projection supporting apparatus further includes a technology map generation unit and an output unit. The technology map generation unit generates a one-dimensional technology map having a temporal axis indicating time to be required to implement technology, by arranging each of the plurality of selected technical phrases on the one-dimensional technology map according to any one of the first and second attributes associated with the technical phrase. Then, the output unit outputs the one-dimensional map thus generated.

Still further preferably, the future technology projection supporting apparatus also includes a field-by-field noteworthy word storage unit and an impact determination unit. The field-by-field noteworthy word storage unit collects and stores words each having a low correlation value in technical documents in each of technical fields. With reference to the noteworthy words in the technical field designated as the survey target through the input unit, the impact determination unit determines a business impact expected when a matter indicated by each of the selected technical phrases is put into practice.

Here, on condition that a selected technical phrase contains at least one of the noteworthy words in the technical field designated as the survey target through the input unit, the impact determination unit gives the selected technical phrase a third attribute indicating a high business impact. On the other hand, on condition that a selected technical phrase contains no noteworthy words in the technical field designated as the survey target through the input unit, the impact determination unit gives the selected technical phrase a fourth attribute indicating a low business impact. Then, the analyzed data storage unit stores each of the technical phrases in association with the obtained attribute given by the impact determination unit.

More preferably, the future technology projection supporting apparatus also includes a technology map generation unit and an output unit. The technology map generation unit generates a two-dimensional technology map having a temporal axis indicating time to be required to implement technology and an impact axis indicating business impact. According to any one of the first and second attributes and any one of the third and fourth attributes associated with the plurality of technical phrases selected by the specific field selection unit, the technology map generation unit arranges each of the plurality of selected technical phrases on the two-dimensional map, thereby generating the two-dimensional map. Then, the output unit outputs the two-dimensional map thus generated.

Still preferably, the future technology projection supporting apparatus further includes an abbreviation rule storage unit and a naming unit. The abbreviation rule storage unit stores an abbreviation rule indicating a rule for transforming each of the plurality of keywords into an abbreviated expression. The naming unit gives a name to each of the selected technical phrases by abbreviating the technical phrase in accordance with the abbreviation rules. Thus, the technology map generation unit generates a technology map by use of the technical phrases abbreviated by the naming unit instead of the technical phrases.

Yet further preferably, in order to show a direction of technology development, the output unit joins the technical phrase having the first attribute to the technical phrase having the second attribute with an arrow, and also outputs the arrow on the technology map. Here, both of the technical phrases are extracted from the same one of the technical documents, and the arrow points from the technical phrase having the first attribute to the technical phrase having the second attribute.

Hereinabove, the present invention has been described as the future technology projection supporting apparatus for supporting the projection of a future technological trend by analyzing a plurality of technical articles. However, the present invention can be understood as a method, a program or a storage medium having the program stored therein, the method and the program used for supporting the projection of a future technological trend by analyzing technical literature. The present invention also can be understood as a method for providing a service of supporting the projection of a future technological trend by analyzing a plurality of technical documents through processing by a computer on which the computer program is executed.

BRIEF DESCRIPTION OF THE DRAWINGS

For a more complete understanding of the present invention and the advantage thereof, reference is now made to the following description taken in conjunction with the accompanying drawings.

FIG. 2 is a diagram showing an example of a first list in which keywords are listed.

FIG. 3 is a diagram showing an example of a second list in which frequently-appearing words in the field of robot are listed.

FIG. 4A is a diagram showing a relationship between a third list having listed noteworthy words in the field of robot, and the second list having listed frequently-appearing words in the same field. FIG. 4B is a diagram showing an example of the third list in which noteworthy words in the field of robot are listed.

FIG. 5 is a diagram showing an example of abbreviation rules.

FIG. 6A is a diagram showing a technical literature in XML format. FIG. 6B is a diagram showing an example of an output from a technical phrase extraction unit 155. FIG. 6C is a diagram showing an example of an output from an impact determination unit 165. FIG. 6D is a diagram showing an example of an output from a naming unit 170.

DETAILED DESCRIPTION OF THE PREFERRED EMBODIMENT

Figure 1:
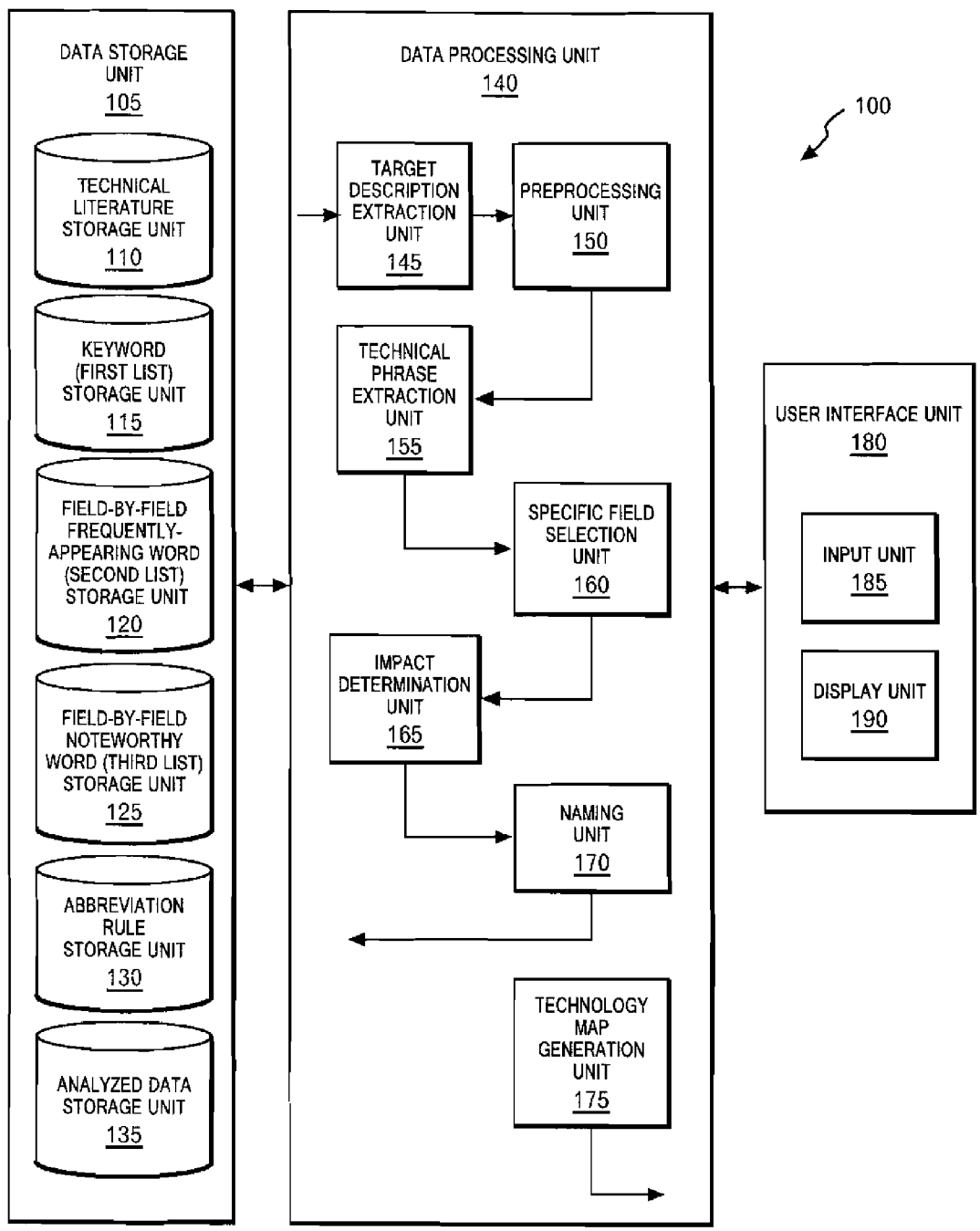
FIG. 1 is a diagram showing an example of a functional configuration of a technology projection supporting apparatus 100 according to an embodiment of the present invention.

According to the present invention, technical phrases each indicating a matter to be achieved by a technology described in each technical literature can be automatically obtained and provided, through computer processing, together with information on a time length to be required to achieve the matter or on a time length to be required to achieve the matter and a business impact to be made by the matter. Moreover, the present invention allows the thus extracted technical phrases to be provided in a state arranged on a one-dimensional or two-dimensional map. Here, the one-dimensional map has a temporal axis indicating time to be required to implement technology, while the two-dimensional map has a temporal axis indicating time to be required to implement technology and an impact axis indicating business impact. As a result, the information thus provided makes it possible to find a technology having a business value and to know the difficulty of implementing the technology.

Hereinafter, a preferred embodiment for carrying out the present invention will be described in detail by referring to the drawings. The present invention according to the scope of claims is not limited to the following embodiment. Moreover, the entire combination of features described in the embodiment is not necessarily essential to the solving means of this invention. Incidentally, the same reference numerals are given to the same elements throughout the descriptions of the embodiment.

FIG. 1 shows an example of a functional configuration of a technology projection supporting apparatus 100 according to the embodiment of the present invention. The technology projection supporting apparatus 100 includes a data storage unit 105 for storing various data, a data processing unit 140 and a user interface unit 180. The data processing unit 140 receives the data stored in the data storage unit 105, analyzes and processes input data with reference to the data stored in the data storage unit 105, and then outputs the resultant data with new information added thereto. The user interface unit 180 performs processing for the entire user interaction, such as processing of receiving instructions from a user and returning processing results to the user.

The data storage unit 105 includes a technical literature storage unit 110, a keyword storage unit 115, a field-by-field frequently-appearing word storage unit 120, a field-by-field noteworthy word storage unit 125, an abbreviation rule storage unit 130 and an analyzed data storage unit 135. A data processing unit 140 includes a target description extraction unit 145, a preprocessing unit 150, a technical phrase extraction unit 155, a specific field selection unit 160, an impact determination unit 165, a naming unit 170 and a technology map generation unit 175. Moreover, a user interface unit 180 includes an input unit 185 and a display unit 190.

A technology projection supporting method of the present invention mainly includes the following three kinds of processing to be performed. 1) Processing of extracting phrases from technical documents classified into a focused technical field. More precisely, the phrases each indicate a matter to be accomplished by a technology disclosed in the technical literature (hereinafter, such phrase is simply referred to as "a technical phrase"). This is because a technology map is required to provide information that can be used for considering the possibility of applying the technology to business. 2) Processing to project characteristics of the extracted technical phrase. More specifically, the processing includes estimating a time length to be required to accomplish a matter indicated by the extracted technical phrase, and estimating a business impact to be made when a matter indicated by the extracted technical phrase is actually put into practice. 3) Processing to arrange analysis results to form a technology map. The obtained analysis results are arranged, thereby finally being outputted as a one-dimensional or two-dimensional technology map.

Here, descriptions are given for relationships among the above functional blocks and the above three kinds of processing, one by one. The first processing is performed by the target description extraction unit 145, the preprocessing unit 150 and the technical phrase extraction unit 155. The second processing is performed by the technical phrase extraction unit 155 in terms of the time characteristic, and by the impact determination unit 165 in terms of the impact characteristic. The third processing is performed by the naming unit 170 and the technology map generation unit 175. The processing performed by each of the functional blocks will be described in detail below.

The technical literature storage unit 110 stores multiple technical literatures each including a problem describing section and an effect describing section. In the problem describing section, problems to be solved are described, while, in the effect describing section, effects to be achieved by proposed solving means are described. In the present invention, any information source can be employed to project future technological trends as long as the information source is literature including the problem describing section, the effect describing section and technical matters.

A patent application laid-open publication can be cited as a specific example of such technical literature. In the patent application laid-open publication, the problem describing section corresponds to a part titled as "Problems" in the "Abstract" section, and the effect describing section corresponds to a part titled as "Effects of the Invention" in the "Disclosure of the Invention" section. In addition, academic papers also can be used as the technical literature according to the present invention. In this case, "Abstract" and "Background" sections can be used as the problem describing section, while a "Summary" section can be used as the effect describing section.

The target description extraction unit 145 extracts the problem describing section and the effect describing section from each of multiple technical literatures. The problem describing section and the effect describing section are described distinctively from the descriptions of other parts, and thereby can be extracted by use of the titles of description sections such as a section title and a caption.

For example, in the case of a document written in a markup language such as XML (Extensible Markup Language), it suffices to search out a start-tag of an element having such a name as an element name, and then to extract the description within a range between the start-tag and its end-tag. FIG. 6A shows an example of the technical literature written in the XML format. In this example, the target description extraction unit 145 extracts the part between a start-tag <issue> and an end-tag </issue> as the problem describing section, and extracts the part between a start-tag <effect> and an end-tag </effect> as the effect describing section.

As preprocessing for processing performed by the technical phrase extraction unit 155, which will be described later, the preprocessing unit 150 performs syntax analysis and morphological analysis on multiple problem describing sections and effect describing sections extracted by the target description extraction unit 145. The syntax analysis and the morphological analysis are known techniques in this technical field, and there are many commercially-available or free software applications for processing of these analyses. Accordingly, the detailed explanation thereof is omitted here.

The keyword storage unit 115 stores a first list having listed keywords that are each used as a key for extracting a technical phrase indicating a matter to be accomplished by each of the technologies described in the multiple technical documents. As described above, the content described in the technology map desirably includes the phrase that can be used for considering the possibility of applying the technology to business. As a result of a survey, the inventors of the present application found that the desirable technical phrases generally include keywords as shown in FIG. 2. In addition, the inventors of the present application also found that the keywords can be classified into any one of a word indicating characteristic improvement, a word indicating problem alleviation and a word indicating achievement of a new challenge. Note that this finding is not limited only to Japanese, but is applicable to any other languages such as English, Chinese, French and German. Accordingly, the first list written in another language can be a list including words in FIG. 2 translated into the language. As a matter of course, another first list in still another language can be added.

As shown in FIG. 2, the keywords indicating characteristic improvement include words such as "enhance" and "mitigate" for example. The keywords indicating problem alleviation include words such as "prevent" and "reduce," for example. In addition, the keywords indicating achievement of a new challenge other than the aforementioned ones include words such as "enable" and "obtain," for example. Incidentally, the first list shown in FIG. 2 is just one example, and any other keywords can be added to the first list.

The technical phrase extraction unit 155 reads out the first list from the keyword storage unit 115, and extracts a technical phrase from each of multiple problem describing sections and multiple effect describing sections with reference to the multiple keywords listed in the first list. Here, the problem describing sections and the effect describing sections have been already analyzed in terms of morpheme and syntax by the preprocessing unit 150. To be more precise, the technical phrase extraction unit 155 checks words in the problem describing section or the effect describing section from the beginning, thereby searching for a phrase matching with any of the keywords listed in the first list. Upon detection of the phrase matching with the listed keyword, the technical phrase extraction unit 155 retraces the sentence, and picks up words related to the keyword within a dependency range with a depth predetermined by a person in charge (simply called an operator, below). More precisely, from the problem describing section or the effect describing section, the technical phrase extraction unit 155 extracts, as the technical phrase to be extracted, a phrase within the dependency range with the predetermined depth, the range ending with the keyword.

For example, assume that the operator sets, as the depth, a pattern of "(a series of nouns) (a postpositional particle of Japanese) (verb) suru," for example. In addition, also assume that there is a sentence "kyôsyo de no sagyô o yôi ni suru tame no habataki dôsa o zitugen suru (a wing-flapping movement for facilitating an operation in a narrow space is achieved)." In this case, the technical phrase extraction unit 155 detects the matching with the keyword in the first list at the place of the word of "zitugen (achievement)." Then, the technical phrase extraction unit 155 retraces the sentence from this detected point and picks up words until the series of nouns ends. The technical phrase extraction unit 155 finally extracts the technical phrase of "habataki dôsa o zitugen suru (a wing-flapping movement is achieved)."

In contrast, now, assume that the operator sets the depth such that all words from a keyword to the head of a sentence can be picked up when the keyword is detected." In this case, the technical phrase extraction unit 155 extracts the whole sentence of "kyôsyo deno sagyô o yôi ni suru tame no habataki dôsa o zitugen suru (a wing-flapping movement for facilitating an operation in a narrow space is achieved)." The set depth depends on how detailed of a technical phrase the operator desires to obtain. Note that, when the language is a different language such as English, the dependency range is defined differently to reflect the syntax of the language. More precisely, the dependency range is defined as one retraced in a forward direction from a keyword in the case of Japanese, while being defined as one traced in a backward direction from a keyword in the case of English.

The technical phrase extraction unit 155 also gives a first attribute to a technical phrase extracted from each of multiple problem describing sections, the first attribute indicating that a matter will be achieved in the near future. Similarly, the technical phrase extraction unit 155 gives a second attribute to a technical phrase extracted from each of multiple effect describing sections, the second attribute indicating that a matter will be achieved in the far future.

In general, the problem describing section describes in essence what will be directly enabled by a technology described in the technical literature directly. In contrast, in many cases, the effect describing section describes further effects, that is, what will be indirectly enabled by the achievement of the technology described in the technical literature. Accordingly, the present invention makes use of such a difference between the described contents of the problem describing section and the effect describing section. In other words, the present invention assumes that the technical phrase extracted from the problem describing section indicates what will be achieved in the near future, while assuming that the technical phrase extracted from the effect describing section indicates what will be achieved in the far future.

Incidentally, there may be a case where the technical phrases extracted from the problem describing section and the effect describing section of one technical literature are the same. In this case, such technical phrases may be excluded from processing targets, or may be processed without any change. In the former case, the technical phrase extraction unit 155 determines whether or not the technical phrases extracted from the problem describing section and the effect describing section of one technical literature are the same. If they are the same, the technical phrase extraction unit 155 discards the technical phrases. In the latter case, the technical phrase extraction unit 155 determines whether or not the technical phrases extracted from the problem describing section and the effect describing section of one technical literature are the same. If they are the same, the technical phrase extraction unit 155 adds, to the extracted technical phrases, information indicating that the technical phrases are the same, in order to output such information together with the technical presentation as required.

The technical phrase extraction unit 155 additionally records the extracted technical phrases and the attribute information set for the technical phrases, for example, at the head or end of the original technical literature. Instead, the technical phrase extraction unit 155 may prepare an empty file for analysis results, and store the information in the empty file. In this case, an identifier of an original technical literature is also stored so as to identify later the technical literature from which a technical phrase was extracted.

FIG. 6B shows an example in which an extracted technical phrase and the attribute information set for the technical phrase are additionally recorded at the head of the XML document shown in FIG. 6A which is used as an original technical literature. In this example, a "future Tech" tag is added to the extracted technical phrase. Moreover, a "time" attribute is defined for a "future Tech" element, and accordingly an attribute given to the technical phrase can be recognized from the value of the "time" attribute. More precisely, "near" is set as the "time" attribute of a technical phrase having the first attribute indicating a technical phrase in the near future, while "far" is set as the "time" attribute of a technical phrase having the first attribute indicating a technical phrase in the far future.

According to the technology projection supporting method of the present invention, multiple technical phrases may be extracted from one technical document. Accordingly, when all technical documents are processed, a huge number of technical phrases are extracted, thereby decreasing the understandability of a finally-obtained technology map. For this reason, it is preferable to narrow down technologies to be surveyed to a specific technical field. One possible method is to limit technical literature inputted to the target description extraction unit 145 only to those belonging to a survey-target technical field. In the case where technical documents are patent application laid-open publications, only survey-target technical literature can be extracted from all the technical literature by use of categories such as the international patent classification (IPC) or F terms, though the F terms are specific to Japan.

Alternatively, another possible method applicable to any kind of technical literature is to limit inputted technical documents to those including a certain character string representing a technical field (such as "speech recognition" or "robot") desired as a survey target. However, such narrowing-down only with this method may be insufficient. For this reason, in this embodiment, the technical documents are further narrowed down through the processing performed by the field-by-field frequently-appearing word storage unit 120, the input unit 185 and the specific field selection unit 160, which will be described later. This narrowing-down processing is also able to exclude general phrases, such as "enables achievement," not depending on the technical fields.

The field-by-field frequently-appearing word storage unit 120 stores a second list containing listed words each having a high correlation value in technical literature in a specific technical field. Here, the specific technical field is the one desired as the survey target by the operator. There may be multiple technical fields. In this case, the field-by-field frequently-appearing word storage unit 120 stores multiple second lists that differ by technical field. Moreover, a word having a high correlation value in technical documents in a specific technical field means that the appearance frequency of the word in the technical documents in the specific technical field is remarkably higher than that of the word in the technical literature in the other technical fields.

FIG. 3 shows one example of a second list automatically generated through computer processing when the specific technical field is "robot." The second list shown in FIG. 3 is obtained under the following conditions.

1. The technical literature used to obtain the second list is limited to 65,384 patent application laid-open publications disclosed from 2005 to 2006.
2. As parts to be processed, used are two describing sections including a part with a title of "Problems" in the "Abstract" section, which is the problem describing section, and a part with a title of "Effects of the Invention" in the "Disclosure of the Invention" section, which is the effect describing section.
3. From among nouns and compound words appearing in 135 documents including the character string "robot" in the two describing sections, a word having a correlation value that is 1 or more times greater than those in the rest of the technical literature is determined as one having a high correlation value. The rest of the technical documents in the other technical fields compared here are the 65,384 patent application laid-open publications excluding the 135 publications. Moreover, a threshold of the correlation value depends on the kind and the amount of technical literature to be processed.

The input unit 185 obtains, from the operator, an input designating a survey-target technical field. The specific field selection unit 160 reads out the second list of the designated technical field from the field-by-field frequently-appearing word storage unit 120. Then, in reference to the words listed in the second list, the specific field selection unit 160 selects technical phrases belonging to the survey-target technical field from among multiple technical phrases extracted by the technical phrase extraction unit 155. More precisely, the specific field selection unit 160 selects only the technical phrases including the words listed in the second list, and determines the multiple technical phrases thus selected as those belonging to the survey-target technical field.

As described above, in the present invention, obtained is a business impact to be made by a matter indicated by the extracted technical phrase if it is actually put into practice. Although it is possible to measure the impact of a technology on business from various points of view, the business impact is figured out here with attention focused on innovative application and usage of the technology. Accordingly, this embodiment pays attention to the appearance of a word having a weak relationship with a specific technical field. This is because it can be considered that the appearance of such a word indicates a new direction of technology application that has never before been considered to be related to the specific technical field. Then, a technical phrase having such a weak relationship is given an attribute indicating a high level of business impact.

The field-by-field noteworthy word storage unit 125 stores a third list having listed words each having a low correlation value in technical literature in a specific technical field. Here, the specific technical field means the technical field desired as the survey target by the operator, as described above. There may be multiple such technical fields. In this case, the field-by-field noteworthy word storage unit 125 stores multiple third lists that differ by technical fields. In addition, a word having a low correlation value in technical literature in a specific technical field means that the appearance frequency of the word in the technical literature in the specific technical field is remarkably lower than that of the word in the technical literature in the other technical fields. Accordingly, the third list is a list of words which are weakly related to the aforementioned specific technical field, but which should be noted in order to determine the business impact.

The third list can be automatically generated through the computer processing, similar to the second list. FIG. 4A shows a relationship between the second and third lists. An area within the rectangular in FIG. 4A indicates a set of nouns and compound words appearing in all the technical documents to be processed. An area within an oval 205 indicates a set of nouns and compound words (hereinafter, called a widely-used keyword list) frequently appearing in all the technical literature to be processed. An area within an oval 210 indicates a set of nouns and compound words (here, those including a character string "robot" in the descriptions) frequently appearing in technical documents classified into a survey-target technical field; that is, the area within oval 210 indicates the second list. An area within an oval 215 indicates a set of nouns and compound words appearing in the technical literature classified into the survey-target technical field.

Here, a shaded area in the area within the oval 215 indicates the third list. To be more precise, the third list is indicated by the area obtained by excluding, from the oval 215, a part overlapping between the ovals 215 and 205 and also apart overlapping between the ovals 215 and 210. This is because a set of words having low correlation values in the technical literature in the specific technical field is composed of nouns and compound words included neither in the widely-used keyword list nor in the second list, from among the nouns and compound words appearing in all the technical literature in the specific technical field.

FIG. 4B shows one example of the third list in the case where the specific technical field is "robot." Here the same conditions are as those described for the second list shown in FIG. 3. In addition, a set of nouns and compound words appearing in the problem describing sections in technical documents of the technical field of "robot" is used as the set of nouns and compound words (the oval 215) appearing in the technical documents in the specific technical field. The range for the oval 215 is narrowed down in order to prevent the third list from including words irrelevant to the determination of a business impact. In addition, apparently irrelevant words such as "koto (thing)" may be defined in advance and thereby excluded from the obtained third list.

From the field-by-field noteworthy word storage unit 125, the impact determination unit 165 reads out the third list of the technical field designated by the operator through the input unit 185. Then, with reference to words listed in the third list, the impact determination unit 165 determines the business impact to be made (also simply called a business impact, below) by each of matters indicated by multiple technical phrases selected by the specific field selection unit 160.

Specifically, on condition that a selected technical phrase includes at least one of words listed in the third list, the impact determination unit 165 gives the technical phrase a third attribute indicating a high business impact. In contrast, on condition that a selected technical phrase does not include any of words listed in the third list, the impact determination unit 165 gives the technical phrase a fourth attribute indicating a low business impact. This is because a word having a low correlation value in technical literature in a specific technical field can be considered as a word having a weak relationship with the specific technical field, whereby the appearance of such a word indicates a new direction of technology application that has never been considered to be related to the specific technical field.

The impact determination unit 165 additionally records the attribute information indicating the thus set business impact, for example, at the head or end of the original technical literature. Instead, the impact determination unit 165 may additionally record the information in the aforementioned file for analysis result.

FIG. 6C shows an example in which the set attribute information indicating the business impact is recorded at the head of the XML document shown in FIG. 6A which is used as an original technical document. In this example, a "bi (business impact)" attribute is additionally defined in the "future Tech" element, and accordingly an attribute given to the technical phrase can be recognized from the value of the "bi" attribute.

More precisely, "high" is set in the "bi" attribute of a technical phrase having the third attribute indicating a high business impact, while "low" is set in the "bi" attribute of a technical phrase having the fourth attribute indicating a low business impact.

In this embodiment, a technical phrase extracted from a technical literature is transformed into an abbreviated expression in accordance with certain rules. This transformation is for improving the understandability of the finally-outputted technology map. However, there may be a case where an original technical phrase cannot be imagined at all from its abbreviated expression. For this reason, it is preferable that use of abbreviated expression be selectable by the operator. The abbreviation rule storage unit 130 stores abbreviation rules each indicating a rule for converting multiple keywords listed in the first list into abbreviated expressions. FIG. 5 shows one example of such abbreviation rules for keywords. The example shown in FIG. 5 includes multiple abbreviation rules.

For example, in the case of "(two kanji characters) suru" such as a keyword " . . . o kôzyô suru (make an improvement of)," the keyword is abbreviated to "(the two kanji characters)." In addition, in the case of "(a noun) ni suru" such as " . . . o yôi ni suru (facilitate)," the keyword is abbreviated to "(the noun)." Moreover, in the case of "(a simoitidan conjugation verb indicating an improvement of a certain characteristic)" such as a keyword " . . . o takameru (enhance)," the keyword is abbreviated to (the verb excluding hiragana).

Moreover, in the cases of (a simoitidan conjugation verb other than the above and a verb including only one kanji)" such as a keyword " . . . o osaeru (check)," these keywords are each abbreviated to "a synonym having two kanji." In addition, in the case of "(a noun) ka (make . . . more . . . )" such as a keyword " . . . no . . . ka," the keyword is used as it is. In the case of "(no or o) (a noun)" such as a keyword " . . . no kôzyô (improvement of)," the keyword is abbreviated to "(the noun)." The keyword " . . . o surukoto ga dekiru (capable of doing)" is abbreviated to "kanô (capable)." Incidentally, the abbreviation rules shown in FIG. 5 are one example, and any rule can be employed as long as the rule allows a phrase to be abbreviated. In addition, any rule may be also used for a language other than Japanese as long as the rule allows a phrase to be abbreviated.

In reference to the multiple abbreviation rules read from the abbreviation rule storage unit 130, the naming unit 170 abbreviates each of multiple selected technical phrases, and gives the name to the technical phrase. For example, the naming unit 170 obtains the name of a technical phrase by excluding post particles and words generally written in hiragana such as "suru (do)" from the extracted technical phrase, by transforming the keywords in accordance with the abbreviation rules shown in FIG. 5, by combining the resultant keywords, and then by adding "gata (type)" at the end of the combined keywords.

By referring to FIG. 5, the processing of the naming unit 170 is described more precisely. In the case where the extracted technical phrase is "yûzâ no tukaigatte o kôzyô suru (improve user's usability), "kôzyô suru (improve)" is abbreviated to "kôzyô" first of all in accordance with the abbreviation rule. Thereafter, its preceding part, "yûzâ no tukaigatte o (user's usability)" is transformed into "yûzâ tukaigatte" by omitting the post particles. Finally, these keywords are combined, and the "gata (type)" is added at the end of the combined keywords. Thereby, "yûzâ tukaigatte kôzyô gata (user's usability improving type)" is obtained.

In the case where the extracted technical phrase is "tyanneru o sentaku suru koto o yôi ni suru (facilitate the selection of a channel)," "yôi ni suru (facilitate)" is abbreviated into "yôi (facilitating)" first of all in accordance with the abbreviation rule. Then, its preceding part, "tyanneru o sentaku suru koto o (the selection of a channel)" is transformed into "tyanneru sentaku (channel selection)" by omitting the post particles and a hiragana expression "suru koto o." Finally, these keywords are combined, and the "gata (type)" is added at the end of the combined keywords. Thereby, "tyanneru sentaku yôi gata (channel selection facilitating type)" is obtained. Other technical phrases can be processed similarly.

The naming unit 170 additionally records the name thus given to the technical phrase, for example, at the head or end of the original technical literature. Instead, the naming unit 170 may additionally record the information in the aforementioned file for analysis results.

FIG. 6D shows an example in which the attribute information indicating the name of the thus named technical phrase is recorded at the head of the XML document shown in FIG. 6A which is used as the original technical literature. In this example, a "name" attribute is additionally defined in the "future Tech" element, and accordingly the name of the technical phrase can be recognized from the value of the "name" attribute. In this example, "onsei ninsiki kanô gata (speech recognition capable type)" is set in the "name" attribute of the technical phrase that "onsei ninsiki o okonau koto ga dekiru (capable of recognizing speech)." In addition, "sadô on hâku gata (operating noise recognition capable type)" is set in the "name" attribute of the technical phrase that "sadô on o hâku suru koto ga dekiru (capable of recognizing operating noise)."

The analyzed data storage unit 135 stores the processing results of each of the foregoing functional blocks. As described above, the processing results may be a file for analysis results in which only the processing results of each functional block are recorded, or the original technical phrase having the analysis results added thereto. In any case, the analyzed data storage unit 135 stores at least the following information concerning each technical phrase: 1) the extracted technical phrase; 2) the identification information for identifying the original technical literature; 3) the attribute about a time length to be required for achievement; 4) attribute about a business impact; and 5) the name of the technical phrase.

The technology map generation unit 175 generates a one-dimensional or two-dimensional technology map by referring to the analysis results stored in the analyzed data storage unit 135. As an example, according to the attributes about the time to be required for achievement, the technology map generation unit 175 generates a one-dimensional technology map with the names of the technical phrases having the first attributes arranged on the left side of the map and with the names of the technical phrases having the second attributes arranged on the right side of the map. Here, the first attributes each indicate a matter that will be achieved in the near future, and the second attributes each indicate a matter that will be achieved in the far future.

As another example, according to the attributes about the time to be required for achievement and the attributes about the business impact, the technology map generation unit 175 generates a two-dimensional map as follows. The technology map generation unit 175 arranges the names of the technical phrases having the first and third attributes on the upper-left side of the map, the names of the technical phrases having the first and fourth attributes on the lower-left side thereof, the first attribute indicating the near future, the third attribute indicating the high business impact, and the fourth attributes indicating the low business impact. Moreover, the technology map generation unit 175 arranges the names of the technical phrases having the second and third attributes on the upper-right side thereof, the names of the technical phrases having the second and fourth attribute on the lower-right side thereof, the second attribute indicating the far future, the third attribute indicating the high business impact, and the fourth attribute indicating the low business impact.

Preferably, the technology map generation unit 175 joins the names of the technical phrases extracted from one technical literature with an arrow pointing from the name of the technical phrase having the first attribute to the name of the technical phrase having the second attribute. More precisely, the technology map generation unit 175 draws the arrow between the names of the technical phrases arranged on the one-dimensional or two-dimensional technology map and extracted from the same technical literature, the arrow pointing from the name of the technical phrase having the first attribute to the name of the technical phrase having the second attribute. This arrow makes it possible to know a relationship between a matter that can be directly enabled and a matter that can be indirectly enabled by the implementation of the same technology. The display unit 190 outputs the technology map generated by the technology map generation unit 175, to an output device such as a display of a computer or a printer connected to the computer, for example.

Figure 7:
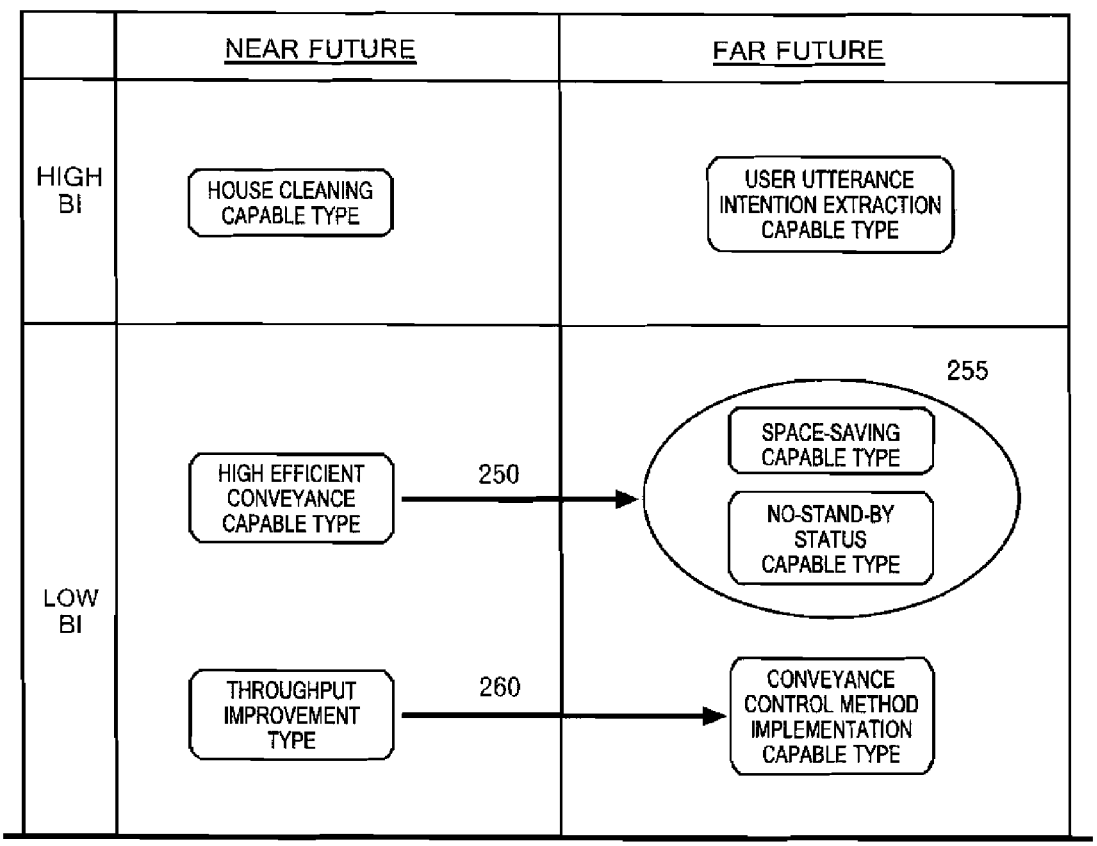
FIG. 7 is a diagram showing an example of a technology map generated according to a technology projection supporting method of the present invention.

FIG. 7 shows an example of the technology map that is generated for the technical field of "robot" by the technology map generation unit 175. In FIG. 7, the horizontal axis indicates an achievement time to be required to achieve a matter indicated by each technical phrase. The vertical axis indicates a business impact to be made when the matter indicated by the technical phrase is put into practice. Arrows 250 and 260 each indicate that the names of multiple technical phrases joined together with the arrow are extracted from one technical literature. Thus, these arrows make it possible to know that these technical phrases indicate matters enabled in the near or far future by the implementation of the same technology. Moreover, an oval 255 indicates that these technical phrases are extracted from the same technical literature and are set to have the same attribute. Note that, the effectiveness of the technology projection supporting method of the present invention will be described later by using the technology map that is automatically and actually generated with this method.

Figure 8:
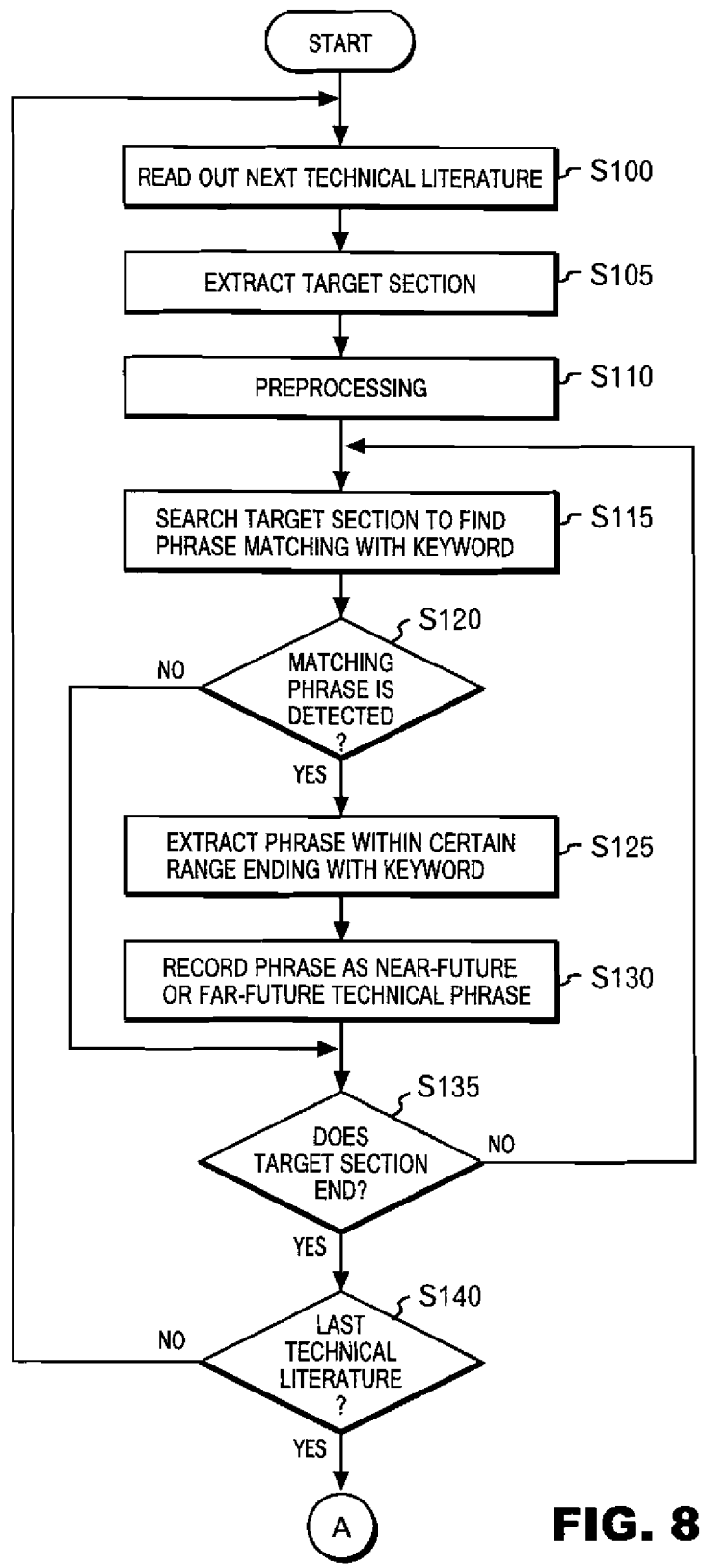
FIG. 8 is a diagram showing a flowchart indicating a part of a processing flow of the technology projection supporting apparatus 100 according to the embodiment of the present invention.

Hereinafter, with reference to FIGS. 8 to 11, descriptions will be given for a processing flow of the technology projection supporting apparatus 100 according to the embodiment of the present invention. As shown in FIG. 8, the processing starts in step 100, and the target description extraction unit 145 reads out one of the technical documents not read-out yet, from the technical literature storage unit 110. Then, from the read-out technical literature, the target description extraction unit 145 extracts the target sections, that is, the problem describing section and the effect describing section (step 105). Next, the preprocessing unit 150 performs the preprocessing on the problem describing section and the effect describing section extracted by the target description extraction unit 145 (step 110). Upon receipt of the pre-processed problem describing section and effect describing section from the preprocessing unit 150, the technical phrase extraction unit 155 searches the problem describing section and the effect describing section with reference to the multiple keywords stored in the keyword storage unit 115, to thereby find a phrase matching with any of the keywords (step 115).

If the matching phrase is detected in step 115 (step 120: YES), the technical phrase extraction unit 155 searches for the words relating to the keyword within the predetermined depth, and thereby extracts a certain range of the phrase ending with the keyword (step 130). Thereafter, the technical phrase extraction unit 155 gives the first attribute to the technical phrase extracted from the problem describing section while regarding the technical phrase as the near-future technical phrase indicating a matter that can be achieved in the near future. Then, the technical phrase extraction unit 155 records the technical phrase together with the attribute information in the file for analysis results or the original technical literature. Similarly, the technical phrase extraction unit 155 gives the second attribute to the technical phrase extracted from the effect describing section while regarding the technical phrase as the far-future technical phrase indicating a matter that can be achieved in the far future. Then, the technical phrase extraction unit 155 records the technical phrase together with the attribute information in the file for analysis results or the original technical literature (step 130).

If no matching phrase is detected in step 115 (step 120: NO), or otherwise from step 130, the processing moves to step 135. Then, the technical phrase extraction unit 155 determines whether or not the target section ends, that is, whether or not the problem describing section ends when the problem describing section is searched, or similarly whether or not the effect describing section ends when the effect describing section is searched (step 135). If the target section does not end (step 135: NO), the processing returns to step 115.

If the target section ends (step 135: YES), the technical phrase extraction unit 155 further determines whether or not the technical document in process is the last one of the technical literatures stored in the technical literature storage unit 110 (step 140). If the technical document is not the last one (step 140: NO), the processing returns to the first step 100. If the technical document is the last one (step 140: YES), the processing moves to step 145 in FIG. 9.

Figure 9:
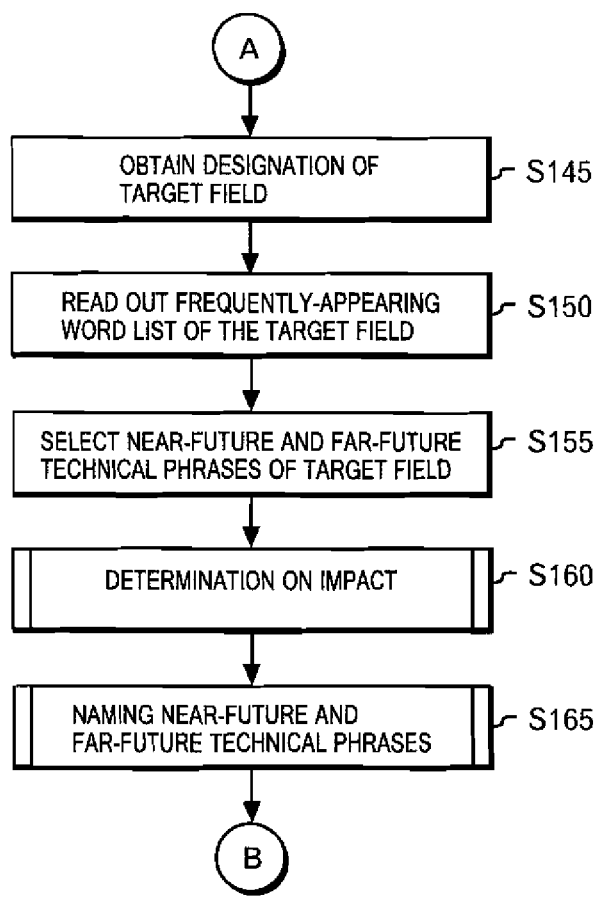
FIG. 9 is a diagram showing a flowchart indicating a part of the processing flow of the technology projection supporting apparatus 100 according to the embodiment of the present invention.

Next, the subsequent processing of the technology projection supporting apparatus 100 will be described by referring to FIG. 9. If YES is determined in step 140 in FIG. 8, the processing moves to step 145 in FIG. 9, and the specific field selection unit 160 obtains the designation of the survey-target technical field, from the operator through the input unit 185, and reads out the frequently-appearing word list of the designated technical field from the field-by-field frequently-appearing word storage unit 120 (steps 145 and 150). Then, from the near-future and far-future technical phrases extracted by the technical phrase extraction unit 155, the specific field selection unit 160 selects the near-future and far-future technical phrases including words that are listed in the frequency-appearing word list (step 155).

Thereafter, the impact determination unit 165 determines the business impact of each of the multiple near-future and far-future technical phrases selected by the specific field selection unit 160 (step 160). The processing of determining the impact will be described in detail later by referring to FIG. 10. After the impact determination unit 165 completes the processing, the naming unit 170 names each of the multiple selected near-future and far-future technical phrases by giving a simple name thereto (step 165). The naming processing will be described in detail later by referring to FIG. 11. After that, the processing moves from step 165 to step 170 in FIG. 12.

Figure 10:
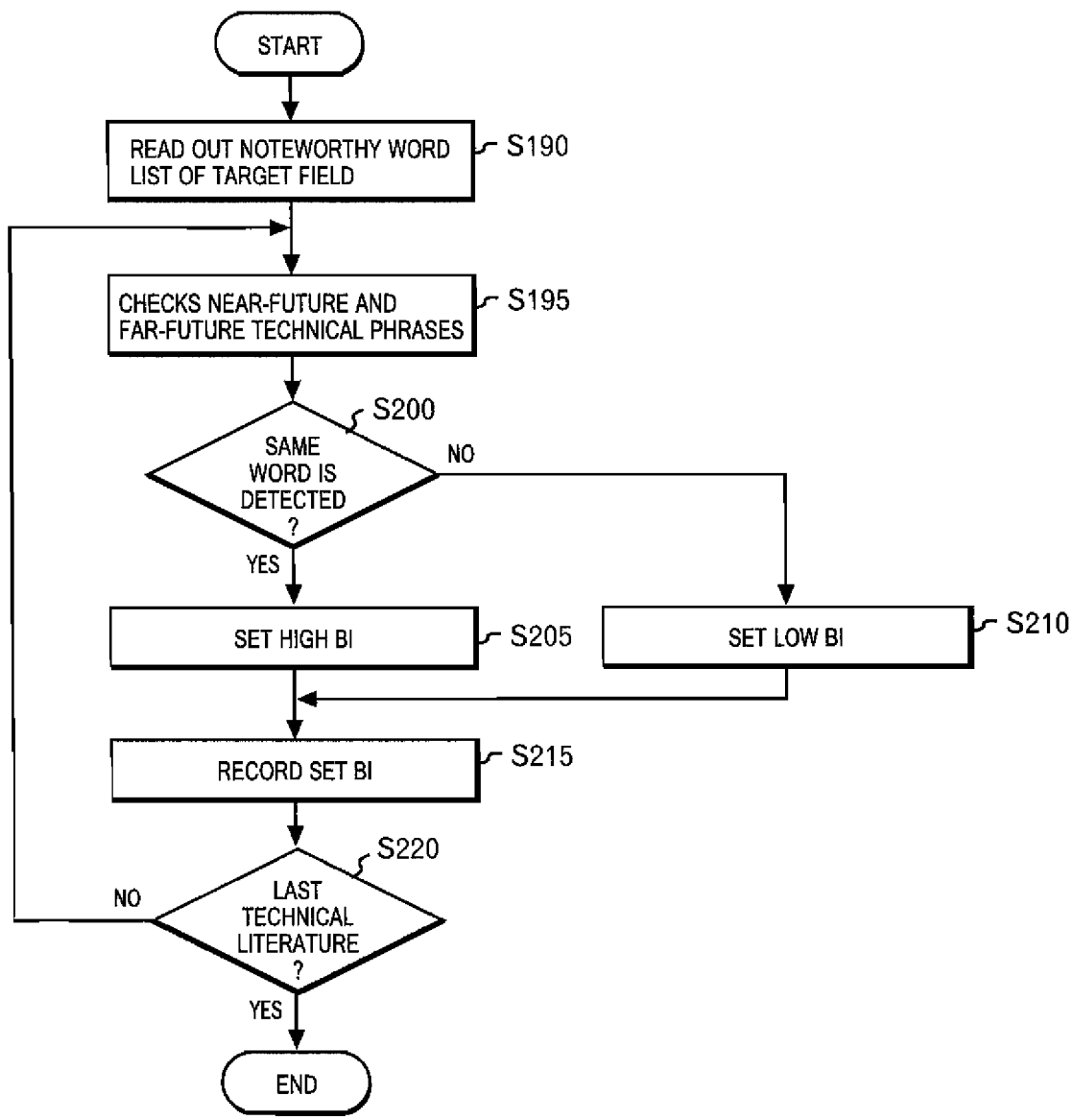
FIG. 10 is a diagram showing a flowchart indicating a part of the processing flow of the technology projection supporting apparatus 100 according to the embodiment of the present invention.

Hereinafter, the processing flow of the impact determination unit 165 will be described by referring to FIG. 10. The processing starts in step 190 and the impact determination unit 165 reads out the noteworthy word list of the designated technical field from the field-by-field noteworthy word storage unit 125. Then, in reference to the noteworthy word list, the impact determination unit 165 checks whether or not each of the selected near-future or far-future technical phrases includes the same word as any of those in the list (step 195).

If the same word is detected in step 195 (step 200: YES), the impact determination unit 165 gives the third attribute indicating the high business impact, to the near-future or far-future technical phrase having the same word detected therefrom (step 205).

On the other hand, if the same word is not detected in step 195 (step 200: NO), the impact determination unit 165 gives the fourth attribute indicating the low business impact, to the near-future or far-future technical phrase having the same word not detected therefrom (step 210). The impact determination unit 165 records the information on the set attribute in the file for analysis results or the original technical literature (step 215). Thereafter, the impact determination unit 165 determines whether or not the technical phrase in process is the last one of the selected near-future or far-future technical phrases (step 220). If the technical phrase is not the last one (step 220: NO), the processing returns to step 195. If the technical phrase is the last one (step 220: YES), the processing for the impact determination ends.

Figure 11:
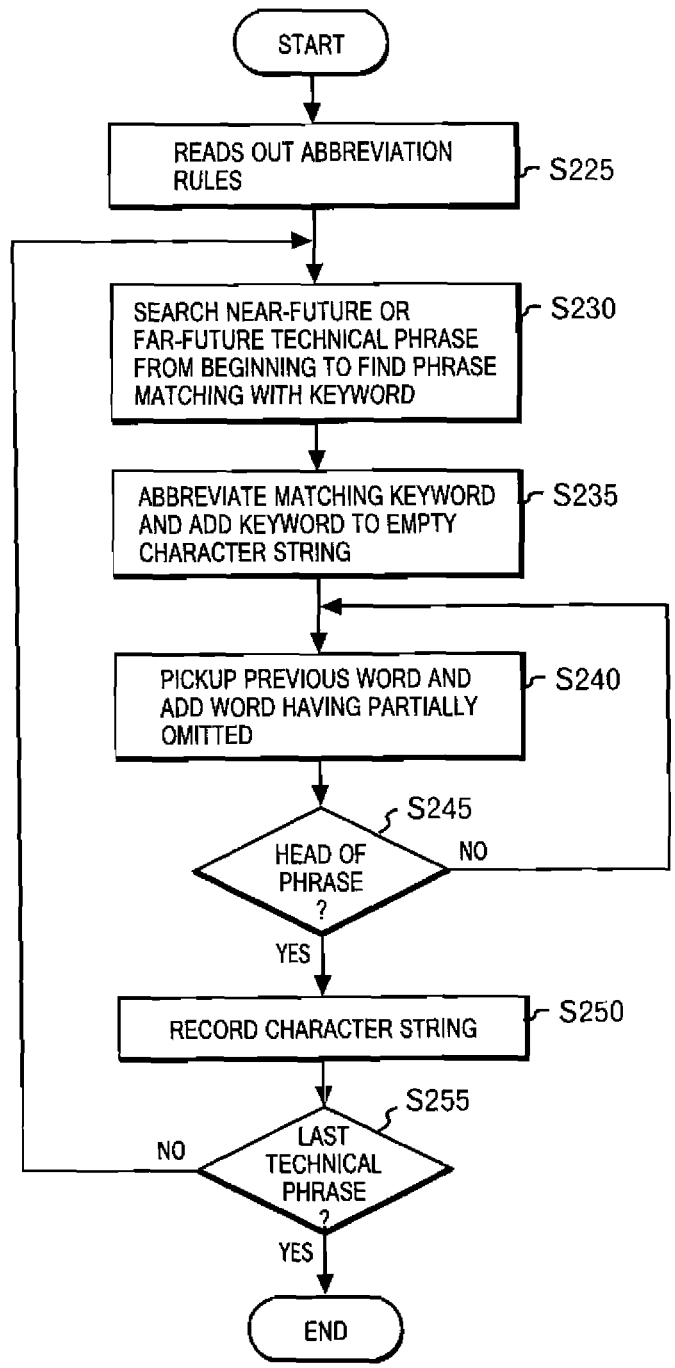
FIG. 11 is a diagram showing a flowchart indicating a part of the processing flow of the technology projection supporting apparatus 100 according to the embodiment of the present invention.

Hereinafter, the processing flow of the naming unit 170 will be described by referring to FIG. 11. The processing starts in step 225, and the naming unit 170 reads out the abbreviation rules from the abbreviation rule storage unit 130. In addition, the naming unit 170 searches each of the selected near-future or far-future technical phrases from the beginning to find a phrase matching with any of the keywords (step 230). If the phrase matching with the keyword is detected, the naming unit 170 abbreviates the detected phrase in accordance with the abbreviation rules corresponding to the keywords, and adds the abbreviated phrase to an empty character string (step 235). Next, the naming unit 170 picks up the word immediately before the matching phrase, and adds the word to the above character string after excluding post particles and hiragana expressions such as "suru (do)" (step 240).

Thereafter, the naming unit 170 determines whether or not the search position after the word is picked up is the head of the technical phrase in process (step 245). If the search position is not the head (step 245: NO), the processing returns to step 240. On the other hand, if the current search position is the head (step 245: YES), the naming unit 170 records the character string in the file for analysis results or the original technical literature (step 250). After that, the naming unit 170 determines whether or not the technical phrase in process is the last one of the selected near-future or far-future technical phrases (step 255). If the technical phrase is not the last one (step 255: NO), the processing returns to step 230. If the technical phrase is the last one (step 255: YES), the processing of the naming unit 170 ends.

Figure 12:
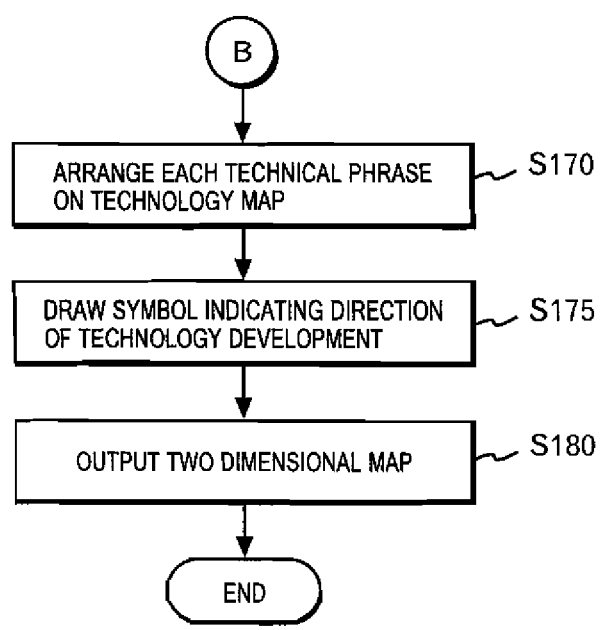
FIG. 12 is a diagram showing a flowchart indicating a part of the processing flow of the technology projection supporting apparatus 100 according to the embodiment of the present invention.

Next, the subsequent processing of the technology projection supporting apparatus 100 will be described by referring to FIG. 12. The processing moves from step 165 in FIG. 9 to step 170 in FIG. 12. Thus, the technology map generation unit 175 reads out the analysis results from the analyzed data storage unit 135, and arranges each technical phrase on a planar technology map on a memory according to the first and second attributes or the first to fourth attributes that have been set for the each technical phrase. At this time, the technology map generation unit 175 writes the technical phrase, as it is, or the name of the technology in a position where the technical phrase should be arranged.

Then, the technology map generation unit 175 joins the technical phrases extracted from one technical literature with an arrow pointing from the near-future technical phrase having the first attribute to the far-future technical phrase having the second attribute, and thereby draws a symbol indicating a direction of the technology development on the technology map (step 175). The generated technology map on the memory is then passed to the display unit 190, and thus the display unit 190 displays the technology map (step 180). In addition to or instead of this, the technology map generation unit 175 may output the technology map to a printer or a facsimile. Then, the processing ends.

Hereinafter, the effectiveness of the technology projection supporting method of the present invention will be described by using a technology map actually and automatically generated through the computer processing in accordance with the method. The technology map shown in FIG. 13 was generated for the technical field of "robot" by using 65,384 patent application laid-open publications disclosed from 2005 to 2006. When the technology map was generated, the first list of the keywords shown in FIG. 2, the second list of the frequently-appearing words shown in FIG. 3, and the third list of the noteworthy words shown in FIG. 4B were used. However, the technology map shown in FIG. 13 shows the original descriptions of only some of the technical phrases taken out from the finally extracted technical phrases.

Figure 13:
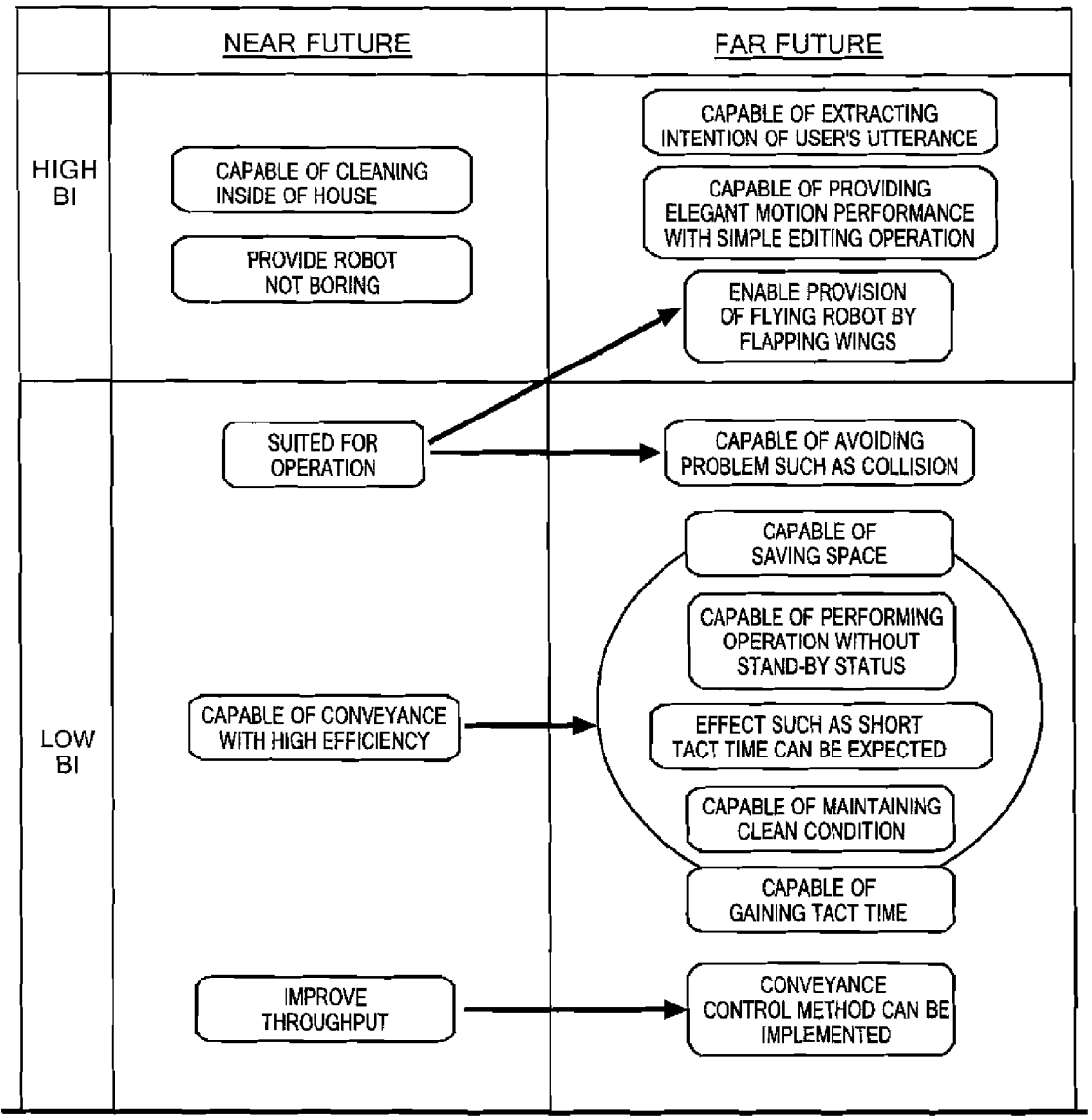
FIG. 13 is a diagram showing an example of a technology map generated according to the technology projection supporting method of the present invention.

From the technology map in FIG. 13, it can be understood that the technology projection supporting method of the present invention gives a low business impact to a naturally predictable matter resulting from application of the robot technology, such as "to improve throughput" or "capable of conveying efficiently." In contrast, it is also understood that the technology projection supporting method of the present invention gives a high business impact to a surprising matter, such as "capable of cleaning the inside of a house" or "provide a robot that is not boring," which cannot be naturally predicted as a result of the application of the robot technology.

When the foregoing technologies were actually surveyed, a Japan's first cleaning robot was released in 2002 from TOSHIBA Corporation in terms of the technology for providing a robot "capable of cleaning the inside of a house" (see TOSHIBA Corporation, "Kokunai hatu no kateiyô zisôsiki kurînâ no hatubai ni tuite (On release of Japan's first automatic vacuum cleaner for home use)" [online], on 5 Sep. 2002, searched on 23 Apr. 2007 on the Toshiba web site at about/press/2002_09/pr_j0501.htm>). In terms of the technology for providing a robot that is not boring, in 2005, NEC Corporation developed a robot that aims not to bore a user by means of an interactive function (see NEC Corporation, "PaPeRo 2005," [online], searched on 23 Apr. 2007 on the NEC web site at robot/papero2005/>). In addition, as for the technology for "obtaining elegant motion performance with easy and simple editing operations," in 2005, Speecys Corp. presented a software application allowing human-like smooth motions to be easily captured (see Speecys Corp., "Nisokuhokô robotto yô môsyon sakusei no sinzidai tûru 'robot Studio for speecys' o hatubai (Release of 'robot Studio for speecys,' a new age tool for generating motions of a bipedal walking robot)," [online] on 13 Sep. 2005, [searched on 23 Apr. 2007], on the speecys.com site at /release/robot-studio_release.pdf>).

The products employing the technologies, which are projected as those providing the high business impact with the technology projection supporting method of the present invention, were commercialized in reality and reported in the media as described above. Thus, this fact supports the effectiveness of the business impact projection method using the technology projection supporting method of the present invention. In addition, the technologies projected as the near-future technologies were actualized by 2005. This fact also proves the effectiveness of the method of projecting the achievement time according to the technology projection supporting method of the present invention. Incidentally, the technology map shown in FIG. 13 is the outcome obtained using the patent application laid-open publications written at least one and a-half years before. For this reason, in the outcome, the near future corresponds to the past, and the far future corresponds to the present or the near future. However, use of technical literature written recently allows a desired future technological trend to be projected. In addition, only two kinds of achievement times such as the near future and the far future are prepared in the aforementioned embodiment. Nevertheless, it is possible to further divide the achievement time into more pieces of the time in consideration of times when technical literatures to be processed were written. For example, in a case of using two kinds of technical literatures written in the respective times having a difference of a half year, the near future for the technical literature written earlier is set to have a range of six months from the present time, and the near future for the technical literature written later is set to have a range from the seventh to the twelve month from the present time.

Figure 14:
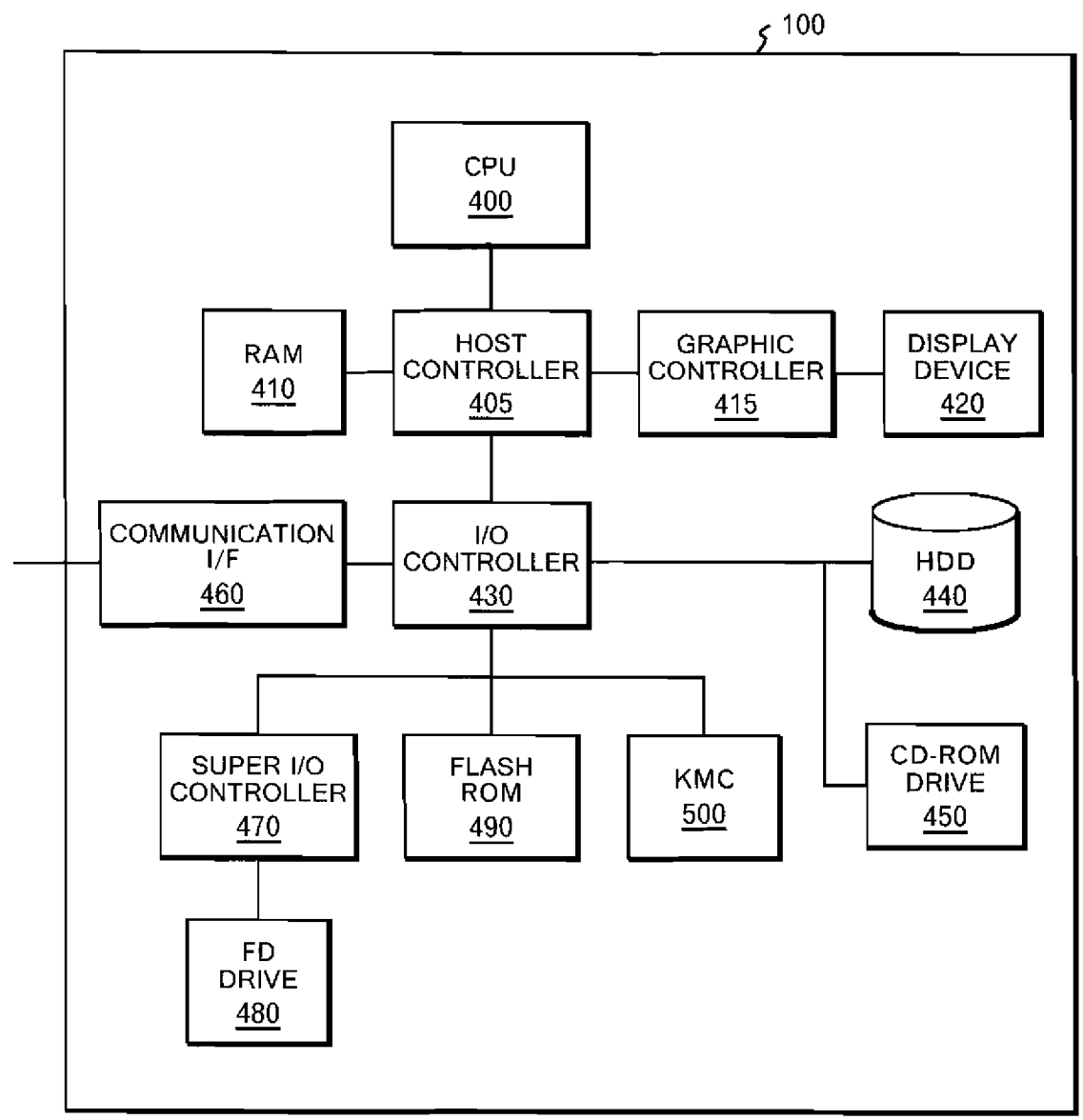
FIG. 14 is a diagram showing an example of a hardware configuration of the technology projection supporting apparatus 100 according to the embodiment of the present invention.

FIG. 14 shows a hardware configuration example of the technology projection supporting apparatus 100 according to the present embodiment. The technology projection supporting apparatus 100 includes a CPU periphery unit, an I/O unit and a legacy I/O unit. The CPU periphery unit includes a CPU 400, a RAM 410, a graphic controller 415 and a display device 420, which are connected to each other via a host controller 405. The I/O unit includes a communication interface 460, a hard disk drive 440 and a CD-ROM drive 450, which are connected to the host controller 405 via an I/O controller 430. The legacy I/O unit includes a super I/O controller 470 connected to the I/O controller 430, and a flexible disk drive 480, a flash ROM 490 and a keyboard/mouse controller 500, which are connected to the super I/O controller 470.

The host controller 405 connects the RAM 410 to the CPU 400 and the graphic controller 415, each of which accesses the RAM 410 at a high transfer rate. The CPU 400 operates in accordance with programs stored in the flash ROM 490 and the RAM 410, and controls each unit. The graphic controller 415 obtains image data that the CPU 400 or the like generates on a frame buffer provided inside the RAM 410, and causes the display device 420 to display the image data. Instead, the graphic controller 415 may internally include a frame buffer for storing image data generated by the CPU 400 or the like.

The I/O controller 430 connects the host controller 405 to the communication interface 460, the hard disk drive 440 and the CD-ROM drive 450, which are relatively-high-speed I/O units. The communication interface 460 is connected to a gateway server (not illustrated) for communication with a wired cable by use of Ethernet protocol, or includes a wired or wireless LAN card. Thus, the communication interface 460 communicates with another computer through a network by use of communication protocol based on standards such as IEEE802.11a/b/g. The hard disk drive 440 stores therein programs and data used by the computer. The CD-ROM drive 450 reads a program or data from a CD-ROM, and provides the read program or data to the CPU 400 through the I/O controller 430.

Moreover, the I/O controller 430 is connected to relatively-low-speed I/O devices such as the flexible disk drive 480 and the keyboard/mouse controller 500, as well as the flash ROM 490. The flash ROM 490 stores a boot program executed by the CPU 400 at a time of starting up the technology projection supporting apparatus 100, hardware dependent programs and the like. The flexible disk drive 480 reads a program or data from a flexible disk, and provides the read program or data to the super I/O controller 470. The super I/O controller 470 is connected to a flexible disk and various I/O devices such as a printer and a facsimile through, for example, a parallel port, a serial port, a keyboard port, a mouse port and other equivalent ports.

Next, a software configuration of the technology projection supporting apparatus 100 will be described. Computer programs (an operating system and application programs) are provided to the technology projection supporting apparatus 100 by a user with the programs stored in recording media, or otherwise with the programs downloaded from Web sites through the network. As such recording media, there are an optical recording medium such as a flexible disk, a CD-ROM, a DVD or a PD, a magneto-optic recording medium such as MD, and a semiconductor memory such as an IC card. The programs are read out from the recording media and installed on the computer through the super I/O controller 470. Instead, the programs are read out from another computer on the network, and installed on the computer through the communication interface 460. Thus, the programs are executed on the computer.

An operating system usable in the technology projection supporting apparatus 100 is Windows (trademark of Microsoft Corporation) XP, Linux (trademark of Linus Torvalds), MAC OS X (Trademark of Apple Inc.), or the like, but is not limited to these mentioned here. In addition, the technology projection supporting apparatus 100 also has a future technology projection supporting program as an application program installed thereon. Then, a combination of such hardware configuration and software configuration allows the technology projection supporting apparatus 100 to provide the functions described in the embodiment.

Heretofore, the present invention has been described with reference to the detailed embodiments. However, the technical scope of the present invention is not limited to the scope of the description in the foregoing embodiment. It is apparent to those skilled in the art that various modifications and variations can be added to the foregoing embodiment. For example, as described above, the technology projection supporting method according to the present invention is applicable not only to technical literature written in Japanese, but also to technical literature written in other languages such as English. Accordingly, an embodiment having such a modification or variation added thereto is also included in the technical scope of the present invention.

What is claimed is:

1. A future technology projection supporting apparatus for supporting the projection of a future technological trend by analyzing a plurality of technical documents, comprising:

a technical literature storage unit for storing a plurality of technical documents each having a problem describing section in which a problem to be solved is described, and an effect describing section in which an effect to be achieved by proposed solving means is described;

a describing section extracting unit for automatically identifying and extracting the problem describing section and the effect describing section from each of the plurality of technical literatures;

a keyword storage unit for storing a plurality of keywords that are used as keys to extract technical phrases each indicating a matter to be achieved by a technology described in each of the plurality of technical documents;

a technical phrase extraction unit for extracting at least one technical phrase from each of the problem describing section and the effect describing section by referring to the plurality of keywords and for automatically determining and assigning a first attribute to each technical phrase extracted from the problem describing section, the first attribute indicating that the technical phrase represents a matter to be achieved in a near future, and a second attribute to each technical phrase extracted from the effect describing section, the second attribute indicating that the technical phrase represents a matter to be achieved in a far future; and an analyzed data storage unit for storing the technical phrases extracted from the problem describing section in association with the first attribute indicating that the technical phrase represents a matter to be achieved in a near future, and for storing the technical phrases extracted from the effect describing section in association with the second attribute indicating that the technical phrase represents a matter to be achieved in a far future;

an input unit for receiving a designation of a technical field as a survey target;

a field-by-field frequently-appearing word storage unit for storing words each having a high correlation value in technical documents in each of technical fields; and a specific field selection unit for extracting technical phrases belonging to the survey-target technical field, from the plurality of technical phrases stored in the analyzed data storage unit, in reference to frequently-appearing words in the technical field designated as the survey target through the input unit;

a field-by-field noteworthy word storage unit for collecting and storing words each having a low correlation value in technical literatures in each of technical fields; and an impact determination unit for automatically determining a business impact in reference to noteworthy words in the technical field designated as a survey target through the input unit, the business impact expected when a matter indicated by each of the selected technical phrases is put into practice, for automatically determining and giving a selected technical phrase a third attribute indicating a high business impact, on condition that the selected technical phrase contains at least one of the noteworthy words in the technical field designated as the survey target through the input unit, and a fourth attribute indicating a low business impact, on condition that the selected technical phrase contains no noteworthy words in the technical field designated as the survey target through the input unit;

a technology map generation unit for generating a two-dimensional technology map having a temporal axis indicating time to be required to implement technology, and an impact axis indicating business impact, by arranging each of a plurality of selected technical phrases on the two-dimensional map, according to any one of the first and second attributes and any one of the third and fourth attributes associated with each technical phrase; and an output unit for outputting the one-dimensional map thus generated.

2. The future technology projection supporting apparatus according to claim 1, wherein the plurality of keywords stored in the keyword storage unit are classifiable into at least one of a word indicating an improvement in character, a word indicating problem alleviation, and a word indicating achievement of a new challenge.

3. The future technology projection supporting apparatus according to claim 1, further comprising:

an abbreviation rule storage unit for storing an abbreviation rule indicating a rule for transforming each of the plurality of keywords into an abbreviated expression; and a naming unit for giving a name to each of the selected technical phrases by abbreviating the technical phrase in accordance with the abbreviation rules, wherein the technology map generation unit is configured to generate the technology map by using the technical phrases abbreviated by the naming unit instead of the technical phrases.

4. The future technology projection supporting apparatus according to claim 1, wherein the output unit is configured to automatically join the technical phrase having the first attribute to the technical phrase having the second attribute with an arrow, both of the technical phrases extracted from the same one of the technical documents, and the arrow pointing from the technical phrase having the first attribute to the technical phrase having the second attribute, and to further output the arrow on the technology map.

5. A future technology projection supporting program in a non-transitory computer readable medium, the program being executed in an information processing apparatus capable of accessing a plurality of technical documents written in a markup language, the technical documents each having a problem describing section in which a problem to be solved is described, and an effect describing section in which an effect to be achieved by proposed solving means is described, and which is for supporting the projection of a future technology trend by analyzing the plurality of technical documents through processing of the information processing apparatus, the computer program allowing the information processing apparatus to execute the steps of:

automatically identifying and extracting the problem describing section and the effect describing section from each of the plurality of technical documents according to tag information having the names of the describing sections as element names;

extracting at least one technical phrase from each of the problem describing section and the effect describing section by referring to a first list having listed keywords for extracting technical phrases each indicating a matter to be achieved by a technology described in each of the plurality of technical documents;

automatically determining and giving a first attribute indicating a matter to be achieved in a near future, to the technical phrase extracted from the problem describing section;

automatically determining and giving a second attribute indicating a matter to be achieved in a far future, to the technical phrase extracted from the effect describing section;

receiving a designation of a technical field as a survey target;

storing words each having a high correlation value in technical documents in each of technical fields; and extracting technical phrases belonging to the survey-target technical field, from the plurality of technical phrases stored in the analyzed data storage unit, in reference to frequently-appearing words in the technical field designated as the survey target through the input unit;

collecting and storing words each having a low correlation value in technical literatures in each of technical fields; and automatically determining a business impact in reference to noteworthy words in the technical field designated as a survey target through the input unit, the business impact expected when a matter indicated by each of the selected technical phrases is put into practice, for automatically determining and giving a selected technical phrase a third attribute indicating a high business impact, on condition that the selected technical phrase contains at least one of the noteworthy words in the technical field designated as the survey target through the input unit, and a fourth attribute indicating a low business impact, on condition that the selected technical phrase contains no noteworthy words in the technical field designated as the survey target through the input unit;

automatically generating a two-dimensional technology map having a temporal axis indicating time to be required to implement technology, and an impact axis indicating business impact, by arranging each of a plurality of selected technical phrases on the two-dimensional map, according to any one of the first and second attributes and any one of the third and fourth attributes associated with each technical phrase;

automatically generating a technology map having a temporal axis indicating time to be required to implement technology, by arranging each of the plurality of technical phrases on the technology map according to any one of the first and second attributes; and outputting the generated technology map.

6. A computer-implemented method for supporting the provision of a future technological trend by a computer having at least one processor analyzing a plurality of technical documents written in a markup language, the technical documents each having a problem describing section in which a problem to be solved is described, and an effect describing section in which an effect to be achieved by proposed solving means is described, the method comprising the steps of:

at least one processor in said computer executing program steps of:

automatically identifying and extracting the problem describing section and the effect describing section from each of the plurality of technical documents according to tag information having the names of the describing sections as element names;

automatically extracting a technical phrase from each of the problem describing section and the effect describing section by referring to a first list having listed keywords for extracting technical phrases each indicating a matter to be achieved by a technology described in each of the plurality of technical documents;

automatically determining and giving a first attribute indicating a matter to be achieved in a near future, to the technical phrase extracted from the problem describing section;

automatically determining and giving a second attribute indicating a matter to be achieved in a far-future, to the technical phrase extracted from the effect describing section;

receiving a designation of a technical field as a survey target;

storing words each having a high correlation value in technical documents in each of technical fields; and extracting technical phrases belonging to the survey-target technical field, from the plurality of technical phrases stored in the analyzed data storage unit, in reference to frequently-appearing words in the technical field designated as the survey target through the input unit;

collecting and storing words each having a low correlation value in technical literatures in each of technical fields; and automatically determining a business impact in reference to noteworthy words in the technical field designated as a survey target through the input unit, the business impact expected when a matter indicated by each of the selected technical phrases is put into practice, for automatically determining and giving a selected technical phrase a third attribute indicating a high business impact, on condition that the selected technical phrase contains at least one of the noteworthy words in the technical field designated as the survey target through the input unit, and a fourth attribute indicating a low business impact, on condition that the selected technical phrase contains no noteworthy words in the technical field designated as the survey target through the input unit;

automatically generating a two-dimensional technology map having a temporal axis indicating time to be required to implement technology, and an impact axis indicating business impact, by arranging each of a plurality of selected technical phrases on the two-dimensional map, according to any one of the first and second attributes and any one of the third and fourth attributes associated with each technical phrase;

outputting the generated technology map.

\* \* \* \* \*